(12) United States Patent
Nakahori

(10) Patent No.: US 7,414,869 B2
(45) Date of Patent: Aug. 19, 2008

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 30 days.

(21) Appl. No.: 11/700,914

(22) Filed: Feb. 1, 2007

(65) Prior Publication Data

US 2007/0183170 A1    Aug. 9, 2007

(30) Foreign Application Priority Data

Feb. 3, 2006   (JP)   ............... 2006-026711

(51) Int. Cl.
*H02M 7/493*   (2007.01)
*H02M 7/5387*  (2007.01)

(52) U.S. Cl. .......................... 363/71; 363/98
(58) Field of Classification Search .............. 363/56.02, 363/65, 71, 98, 131, 132
See application file for complete search history.

(56) References Cited

U.S. PATENT DOCUMENTS

| | | | |
|---|---|---|---|
| 5,546,294 A * | 8/1996 | Schutten et al. ............... | 363/17 |
| 5,862,041 A * | 1/1999 | Martin ......................... | 363/71 |
| 5,875,103 A * | 2/1999 | Bhagwat et al. ............... | 363/17 |
| 6,317,336 B1 | 11/2001 | Jiang et al. | |
| 6,320,764 B1 | 11/2001 | Jiang et al. | |

FOREIGN PATENT DOCUMENTS

| | | |
|---|---|---|
| JP | A-11-136939 | 5/1999 |
| JP | A-11-262258 | 9/1999 |
| JP | A-2002-112548 | 4/2002 |
| JP | A-2005-086936 | 3/2005 |
| JP | A-2005-224067 | 8/2005 |

OTHER PUBLICATIONS

Hilbert, Andrew, "Guest Viewpoint: Rejuvenated Electric Power Systems Bring 2.3 W/cm$^3$ AC-DC Converters into Life", *Nikkei Electronics* Oct. 10, 2005, pp. 109-118.

* cited by examiner

*Primary Examiner*—Gary L Laxton
(74) *Attorney, Agent, or Firm*—Oliff & Berridge, PLC

(57) ABSTRACT

A switching power supply unit is provided, in which widening of the input voltage range can be achieved while suppressing production of a surge current. A transformer having two primary windings having the number of turns equal to each other, and two inductors are provided correspondingly to two switching circuits. By using an input voltage detection circuit, a control section, and connection changeover switches, when an input DC voltage is lower than a threshold voltage, a first current path and a second current path are connected in parallel to each other, and when the input DC voltage is higher than a threshold voltage, they are connected in series to each other. A turn ratio between the primary windings and secondary windings is large in a case of series connection compared with a case of parallel connection. Moreover, current is gently changes in the circuits by an effect of the inductors.

9 Claims, 31 Drawing Sheets

| Vin | S5, S6 | SERIES/PARALLEL | TURN RATIO(np/ns) |
|---|---|---|---|
| HIGH (Vin≧Vth) | OFF | SERIES | 2n |
| LOW (Vin<Vth) | ON | PARALLEL | n |

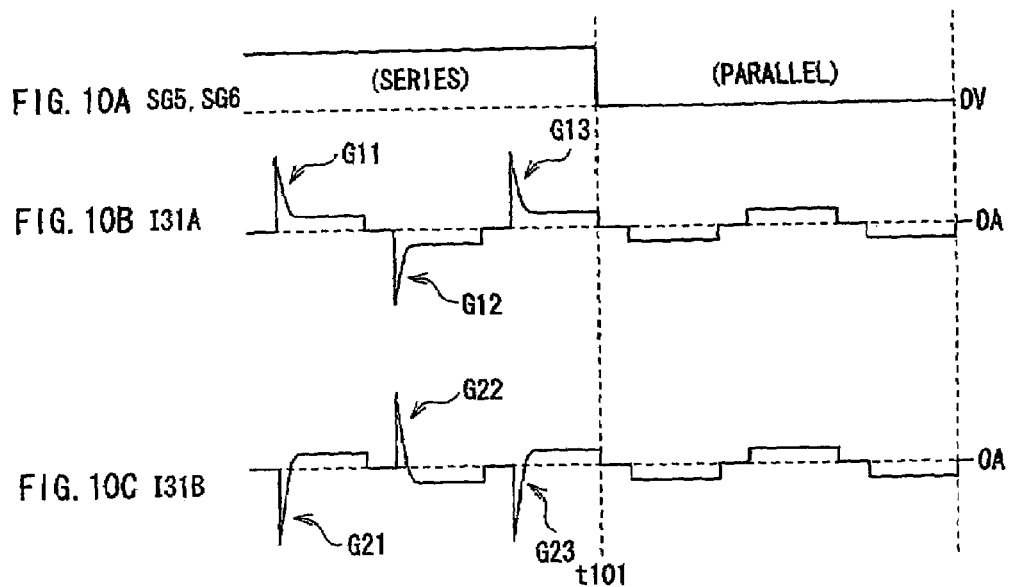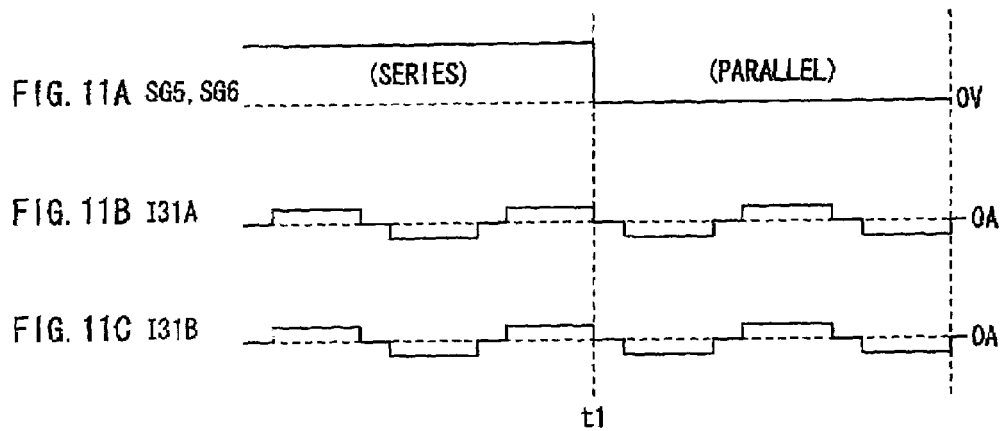

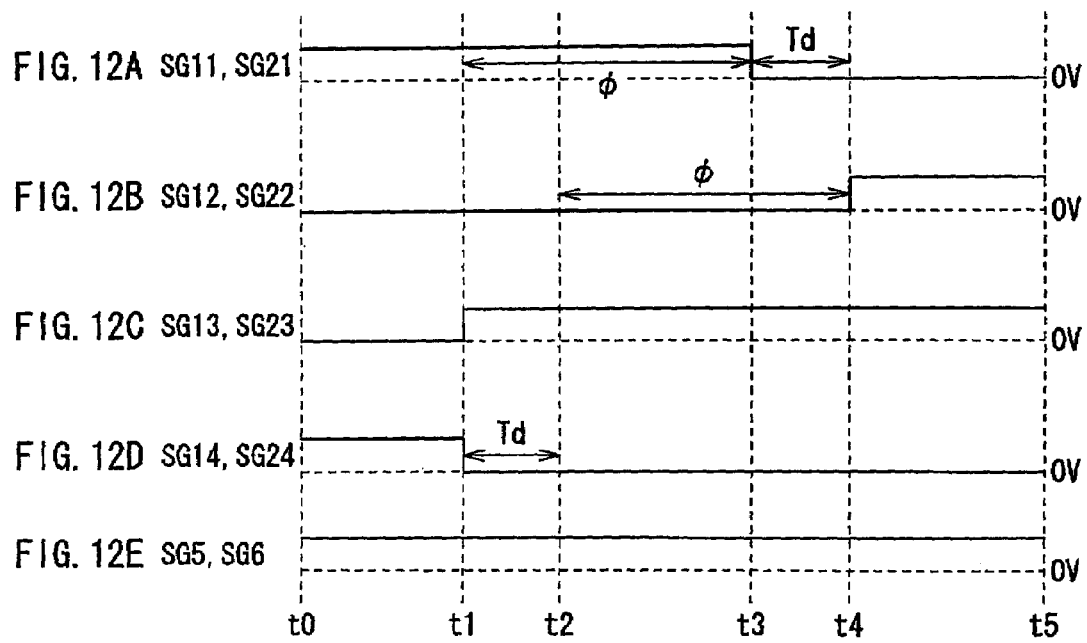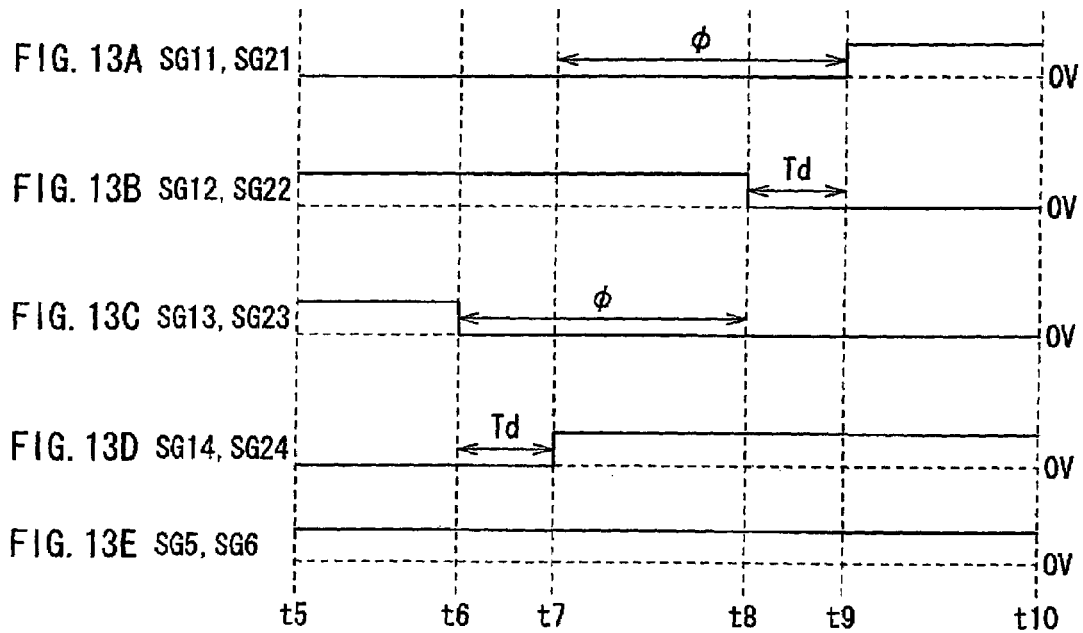

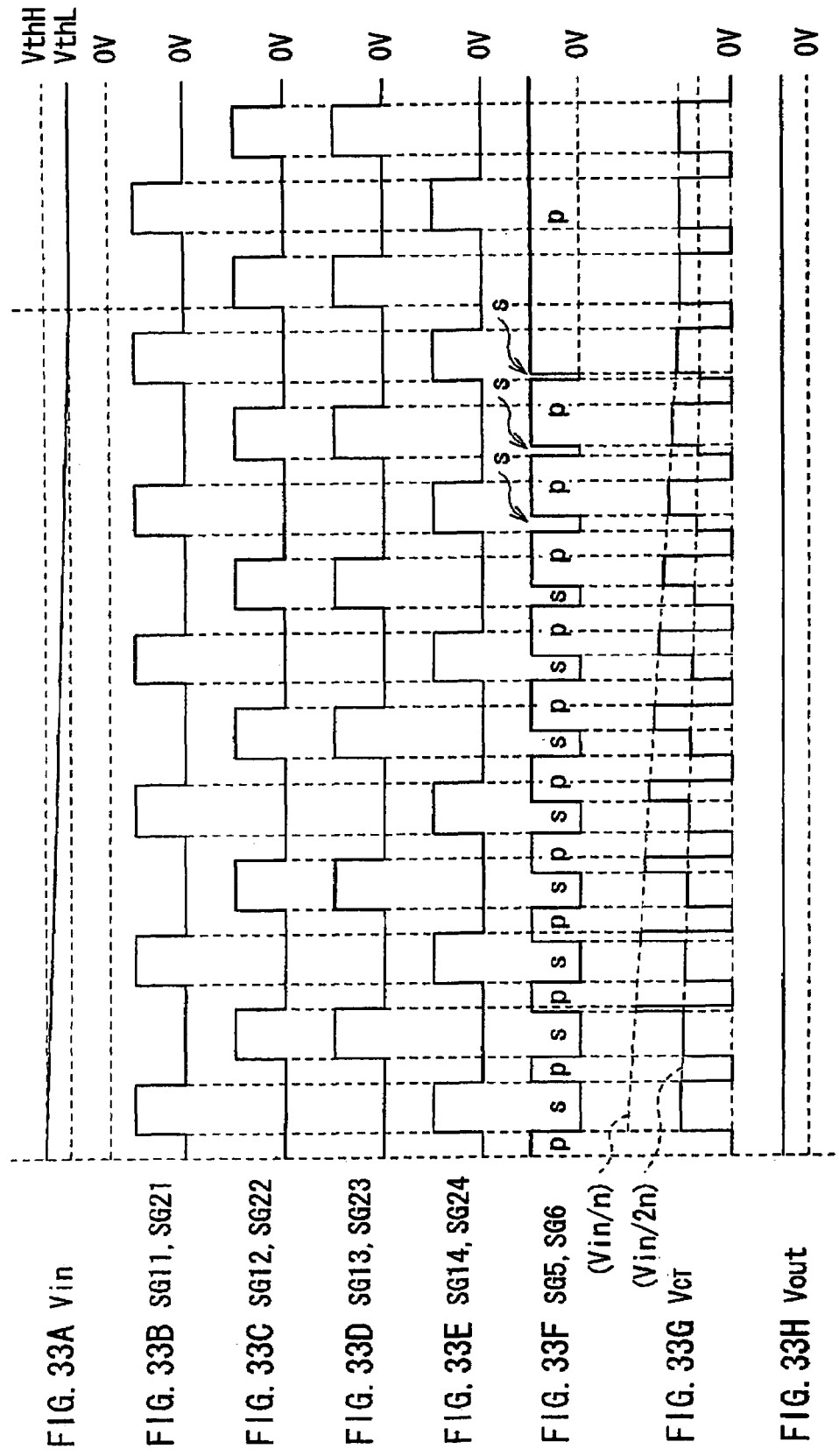

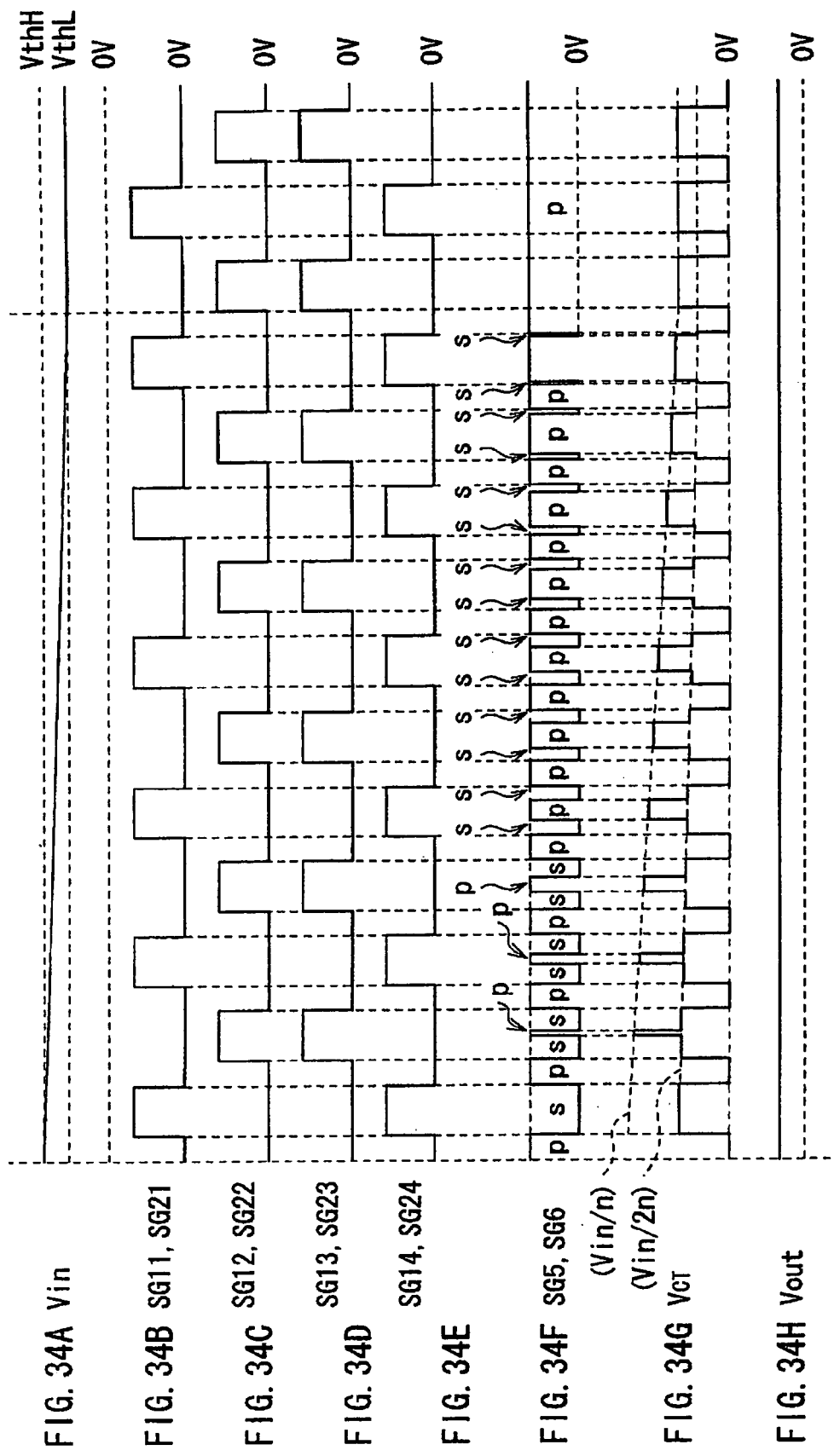

though each of the two primary windings being provided correspondingly to each of the two switching circuits, and the number of windings of the two primary windings being equal to each other, the transformer transforming the input AC voltages to produce an output AC voltage, an output circuit provided at a secondary side of the transformer, and rectifying the output AC voltage to produce an output DC voltage, a drive circuit driving the two switching circuits in synchronization with each other, two inductors each provided correspondingly to each of the two switching circuits, and a connection changeover unit performing connection changeover such that when the input DC voltage is lower than a threshold voltage, a first current path passing one of the two switching circuits and one of the two primary windings of the transformer, and a second current path passing the other switching circuit and the other primary winding of the transformer are connected in parallel to each other, and on the other hand, when the input DC voltage is higher than the threshold voltage, the first and second current paths are connected in series to each other.

SWITCHING POWER SUPPLY UNIT

BACKGROUND OF THE INVENTION

1. Field of the Invention

The present invention relates to a switching power supply unit configured such that switching output obtained by switching an input DC voltage is drawn out from an output winding of a power conversion transformer.

2. Description of the Related Art

Hitherto, various types of switching power supply units have been proposed and provided for practical use. Most of them are in a type where an input DC voltage is switched by switching operation of a switching circuit connected to an input winding of a power conversion transformer, and switching output is drawn out from an output winding of the power conversion transformer. A voltage induced on the output winding in association with such switching operation of the switching circuit is rectified by a rectifier circuit, the rectified voltage is converted to a DC voltage by a smoothing circuit, and the smoothed voltage is outputted.

In a switching power supply unit of this type, it is desirable to widen an input voltage range in which an output voltage can be kept constant. Thus, for example, Japanese Unexamined Patent Publication No. 11-136939 proposes a switching power supply unit in which two windings having the same number of turns are provided at a primary side of a transformer correspondingly to two switching elements (switching circuits), and the two primary windings are connected in series or parallel to each other depending on a level of an input voltage.

SUMMARY OF THE INVENTION

According to a technique of the Japanese Unexamined Patent Publication No. 11-136939, a winding ratio between primary and secondary windings of a transformer can be changed depending on the level of the input voltage, so that an input voltage range, in which an output voltage can be kept constant, seems to be widened.

However, there has been a difficulty in the switching power supply unit that when the two primary windings are connected in parallel, if control timing is shifted even slightly between the two switching circuits in parallel operation (on/off operation timing in the switching elements) due to variation in manufacturing between the elements, an excessive surge current flows due to difference in impedance between the switching circuits.

When the excessive surge current is produced, the switching elements or the like may be broken. Moreover, the control timing is actually hard to be made perfectly equal between them. As a result, an element having a large current capacity must be used, and since an element tends to be increased in size with increase in current capacity, a unit as a whole has been hardly reduced in size.

In this way, in the technique of the related art being small in tolerance for shift in control timing, it has been hard that the input voltage range is widened while suppressing production of the surge current.

In view of foregoing, it is desirable to provide a switching power supply unit, in which widening of the input voltage range can be achieved while suppressing production of the surge current.

A first switching power supply unit of an embodiment of the invention includes two switching circuits each of which is of a full-bridge type including four switching elements, and produces input AC voltages based on an input DC voltage, a In the first switching power supply unit of an embodiment of the invention, the input AC voltages are produced from an input DC voltage inputted into the two switching circuits operating in synchronization with each other, and furthermore the input AC voltages are transformed by the transformer, thereby the output AC voltage is produced. Then, the output AC voltage is rectified by an output circuit, and the rectified voltage is outputted as an output DC voltage. Moreover, the connection changeover unit performs connection changeover such that when the input DC voltage is lower than the predetermined threshold voltage, the first current path and the second current path corresponding to the respective switching circuits are connected in parallel to each other, and when the input DC voltage is higher than the threshold voltage, the first current path and the second current path are connected in series to each other. Here, since the two primary windings of the transformer are corresponding to the two switching circuits respectively, and have the number of turns equal to each other, when the two current paths are connected in series to each other, a turn ratio between the primary windings and the secondary windings is increased compared with a case that they are connected in parallel to each other. Moreover, because the two inductors are provided correspondingly to the two switching circuits respectively, currents are gently changed in the circuits due to an effect of keeping levels of the currents by the inductors.

In the first switching power supply unit of an embodiment of the invention, the connection changeover unit may include connection changeover elements, an input voltage detection circuit detecting the input DC voltage, and a control section controlling the connection changeover elements such that when the input DC voltage detected by the input voltage detection circuit is lower than the threshold voltage, the connection changeover elements are on, and on the other hand, when the input DC voltage is higher than the threshold voltage, the connection changeover elements are off.

In the first switching power supply unit of an embodiment of the invention, a pair of input terminals are provided, and each of the two switching circuits has two arms provided between a plus connection line led from one of the input terminals, and a minus connection line led from the other of the input terminals, and the connection changeover elements include a connection changeover element preferably disposed between a first common connection point and the plus connection line, and include another connection changeover element preferably disposed between a second common connection point and the minus connection line, the first common connection point commonly connecting one end of one arm of one of the two switching circuits and one end of one arm of the other of the two switching circuits, the second common connection point commonly connecting the other end of the one arm of the one of the two switching circuits and the other end of the one arm of the other of the two switching circuits. Here, the term "arm" means a connection line connecting between the cathode connection line and the anode connection line, and for example, a switching circuit of a full-bridge type has a pair of arms including two switching elements connected in series respectively. In the case of such a configuration, the switching circuits perform switching operation at any time in either condition of the parallel connection and series connection, consequently the drive circuit performs drive operation more easily.

Moreover, in the first switching power supply unit of an embodiment of the invention, the connection changeover elements include a connection changeover element may be disposed between a first common connection point and the plus connection line, or include another connection changeover element may be disposed between a second common connection point and the minus connection line, the first common connection point commonly connecting one end of one arm of one of the two switching circuits and one end of one arm of the other of the two switching circuits, the second common connection point commonly connecting the other end of the one arm of the one of the two switching circuits and the other end of the one arm of the other of the two switching circuits. In the case of such a configuration, switching elements at a side where the connection changeover elements are not disposed in the arms of the two switching circuits further operate as connection changeover elements.

Moreover, in the first switching power supply unit of an embodiment of the invention, the connection changeover elements may be configured of a bidirectional switch provided in a manner of H-bridge connection with a bridge circuit, the bridge circuit being configured of a couple of arms each included in each of the two switching circuits. The term "bidirectional switch" means a switch that can flow a current in either direction, and can interrupt the current in either direction.

In the first switching power supply unit of an embodiment of the invention, a pair of input terminals may be provided, and one of the two switching circuits may have a couple of arms, one of which is provided between a plus connection line led from one of the input terminals and a third common connection point, the other of which is provided between the plus connection line and a fourth common connection point, and the other switching circuit may have another couple of arms, one of which is provided between a minus connection line led from the other of the input terminals and the third common connection point, the other of which is provided between the minus connection line and the fourth common connection point, and the connection changeover elements may be configured of a bidirectional switch and disposed between the third common connection point and the fourth common connection point.

A second switching power supply unit of an embodiment of the invention includes two switching circuits each of which is of a full-bridge type including four switching elements, and produces input AC voltages based on an input DC voltage, a transformer having two primary windings and secondary windings, each of the two primary windings being provided correspondingly to each of the two switching circuits, and the number of windings of the two primary windings being equal to each other, the transformer transforming the input AC voltages to produce an output AC voltage, an output circuits provided at a secondary side of the transformer, and rectifying the output AC voltage to produce an output DC voltage, a drive circuit driving the two switching circuits in synchronization with each other, two inductors each provided correspondingly to each of the two switching circuits, and a connection changeover unit performing connection changeover such that a relative period of parallel connection state and a relative period of series connection state are changed depending on a level of the input DC Voltage, respectively, the parallel connection state being a state where a first current path and a second current path are connected in parallel to each other, the series connection state being a state where the first current path and the second current path are connected in series to each other, the first current path being a path where current passes one of the two switching circuits and one of the two primary windings of the transformer, the second current path being a path where current passes the other switching circuit and the other primary winding of the transformer.

In the second switching power supply unit of an embodiment of the invention, the input AC voltages are produced from an input DC voltage inputted into the two switching circuits operating in synchronization with each other, and furthermore the input AC voltages are transformed by the transformer, thereby the output AC voltage is produced. Then, the output AC voltage is rectified by an output circuit, and the rectified voltage is outputted as an output DC voltage. Moreover, the connection changeover unit performs connection changeover such that the relative periods in the parallel connection condition and the series connection condition are changed depending on a level of the input DC voltage respectively. Here, since the two primary windings of the transformer are corresponding to the two switching circuits respectively, and have the number of turns equal to each other, a turn ratio between the primary windings and the secondary windings is increased with increase in relative period in the series connection condition (with decrease in relative period in the parallel connection condition). Moreover, the two inductors are provided correspondingly to the two switching circuits respectively, currents are gently changed in the circuits due to an effect of keeping levels of the currents by the inductors. Furthermore, since the relative periods in the parallel connection condition and the series connection condition are changed depending on a level of the input DC voltage respectively, the turn ratio is not abruptly changed (continuously changed).

In the second switching power supply unit of an embodiment of the invention, it is possible that the connection changeover unit performs connection changeover such that as the input DC voltage is increased, the relative period of the parallel connection state is decreased, while the relative period of the series connection state is increased. In the case of such a configuration, the turn ratio is gently increased with increase in the input DC voltage.

In the second switching power supply unit of an embodiment of the invention, the connection changeover unit can be configured to have connection changeover elements, an input voltage detection circuit detecting the input DC voltage, and a control section controlling the connection changeover elements such that the relative periods of parallel connection state are decreased as the input DC voltage detected by the input voltage detection circuit increases.

According to the first switching power supply unit of an embodiment of the invention, the transformer having the two primary windings having the number of turns equal to each other correspondingly to the two switching circuits, and the two inductors are provided, and by using the connection changeover unit, when the input DC voltage is lower than the predetermined threshold voltage, the first current path and the second current path are connected in parallel to each other, and when the input DC voltage is higher than the threshold voltage, the first current path and the second current path are connected in series to each other, therefore the turn ratio between the primary windings and the secondary windings can be increased in a case of the series connection compared with a case of the parallel connection, and current can be gently changed in the circuits. Accordingly, the turn ratio can be changed depending on a level of the input DC voltage, and tolerance for shift in timing between the switching circuits can be increased, consequently an input voltage range can be widened while suppressing production of surge currents.

According to the second switching power supply unit of an embodiment of the invention, the transformer having the two primary windings having the number of turns equal to each other correspondingly to the two switching circuits, and the two inductors are provided, and by using the connection changeover unit, the relative periods in the parallel connection state and the series connection state are changed respectively depending on a level of the input DC voltage, therefore the turn ratio between the primary windings and the secondary windings can be increased with increase in relative periods in the series connection state (with decrease in relative periods in the parallel connection condition), and current can be gently changed in the circuits. Accordingly, the turn ratio can be changed depending on a level of the input DC voltage, and tolerance for shift in timing between the switching circuits can be increased, consequently an input voltage range can be widened while suppressing production of surge currents.

In particular, according to the second switching power supply unit of an embodiment of the invention, since the relative periods in the parallel connection state and the series connection state are changed respectively depending on a level of the input DC voltage, the turn ratio can be continuously changed, consequently abrupt change in the turn ration can be avoided. Accordingly, even if an element having a slow response speed exists in a unit, the turn ratio can be changed without any problem, consequently the output DC voltage can be stabilized independently of response speed of each element.

Other and further objects, features and advantages of the invention will appear more fully from the following description.

BRIEF DESCRIPTION OF THE DRAWINGS

FIG. 10 is a timing waveform view for explaining operation of the switching power supply unit according to a comparative example;

FIG. 11 is a timing waveform view for explaining operation of the switching power supply unit of FIG. 1;

FIG. 12 is a timing waveform view for explaining phase shift control;

FIG. 13 is a timing waveform view for explaining phase shift control following FIG. 12;

FIG. 33 is a timing waveform view for explaining connection changeover operation according to a modification of the fifth embodiment; and FIG. 34 is a timing waveform view for explaining connection changeover operation according to a modification of the fifth embodiment.

DETAILED DESCRIPTION OF THE PREFERRED EMBODIMENTS

Hereinafter, the best mode for carrying out an embodiment of the invention (hereinafter, simply referred to as embodiment) will be described in detail with reference to drawings.

First Embodiment

Figure 1:
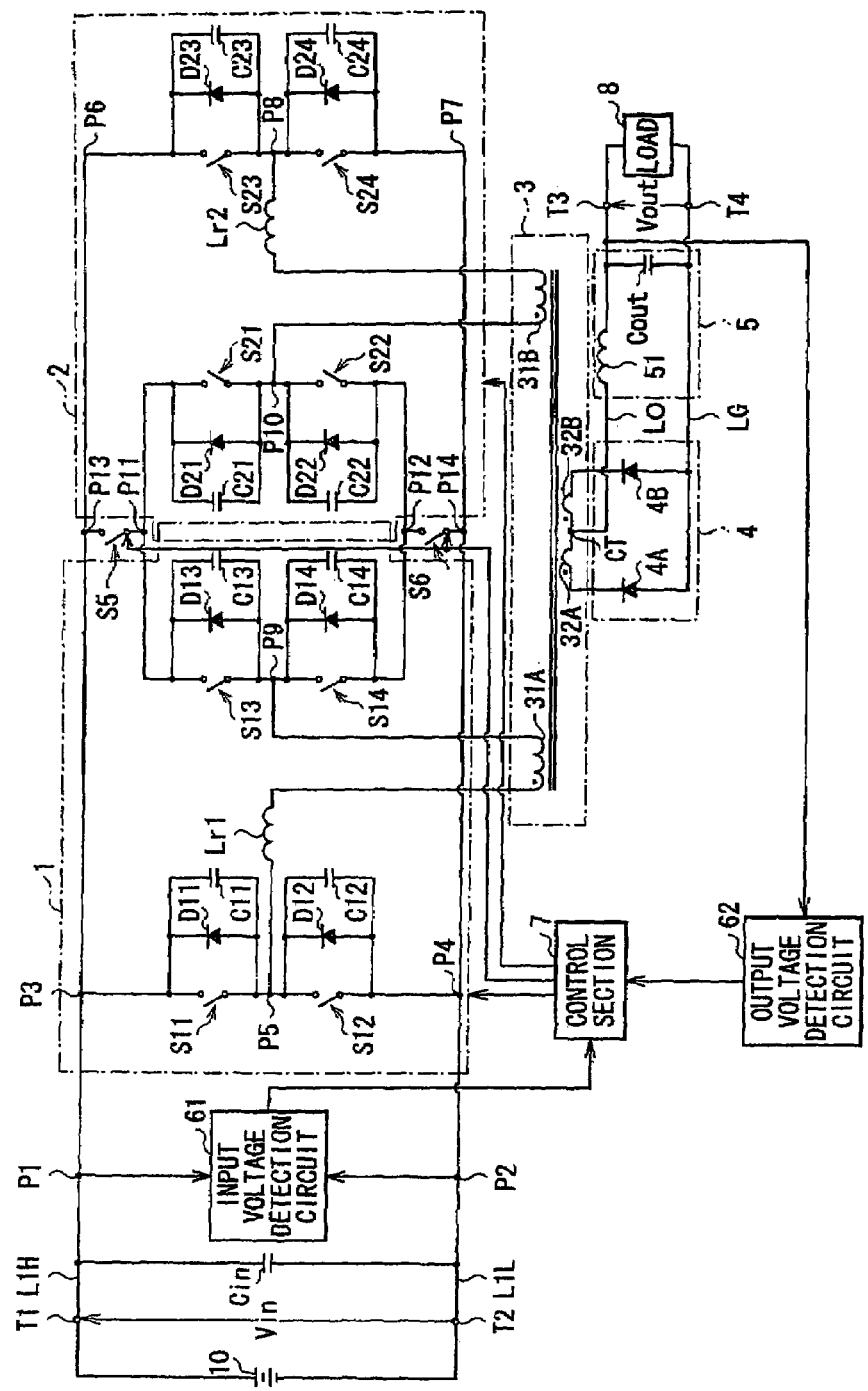
FIG. 1 is a circuit diagram showing a configuration of a switching power supply unit according to a first embodiment of the invention.

FIG. 1 shows a configuration of a switching power supply unit according to a first embodiment of the invention. The switching power supply unit operates as a DC-DC converter converting a high input DC voltage $V_{in}$ supplied from a high-voltage battery 10 to a comparatively low output DC voltage $V_{out}$, and supplies the voltage $V_{out}$ to a not-shown low-voltage battery for driving a load 7.

The switching power supply unit includes an input smoothing capacitor $C_{in}$ provided between a primary high-voltage line L1H and a primary low-voltage line L1L; two switching circuits 1 and 2; two connection changeover switches S5, S6 and two inductors Lr1, Lr2; a transformer 3 having primary windings 31A, 31B and secondary windings 32A, 32B; a rectifier circuit 4 provided at a secondary side of the transformer 3; a smoothing circuit 5 connected to the rectifier circuit 4; an input voltage detection circuit 61 of detecting the input DC voltage $V_{in}$; an output voltage detection circuit 62 detecting the input DC voltage $V_{out}$; and a control section 7 for controlling the switching circuits 1, 2 and the connection changeover switches S5, S6 respectively.

The input smoothing capacitor $C_{in}$ is for smoothing the input DC voltage $V_{in}$ inputted from input terminals T1 and T2.

The switching circuit 1 has four switching elements S11 to S14, capacitors C11 to C14 and diodes D11 to D14 being connected in parallel to the switching elements S11 to S14 respectively, so that has a circuit configuration of full-bridge type. In other words, the switching circuit 1 has two arms including an arm at a side where switching elements S11 and S12 are disposed, and an arm at a side where switching elements S13 and S14 are disposed. In detailed description of the configuration of the full-bridge type, one end of the switching element S11 and one end of the switching element S12 are connected to each other at a connection point P5, and one end of the switching element S13 and one end of the switching element S14 are connected to each other at a connection point P9. Moreover, the other end of the switching element S11 and the other end of the switching element S13 are connected to each other at a connection point P13 via a connection changeover switch S5, and the other end of the switching element S12 and the other end of the switching element S14 are connected to each other at a connection point P14 via a connection changeover switch S6, and the other ends of the switching elements S1 and S13 are connected to the input terminals T1 and the other ends of the switching elements S12 and S14 are connected to the input terminals T2. According to such a configuration, the switching circuit 1 converts the input DC voltage $V_{in}$ applied between the input terminals T1 and T2 into an input AC voltage depending on drive signals (drive signals SG11 to SG14) supplied from the control section 7.

Similarly, the switching circuit 2 has four switching elements S21 to S24, capacitors C21 to C24 and diodes D21 to D24 being connected in parallel to the switching elements S21 to S24 respectively, so that has a circuit configuration of full-bridge type. In other words, the switching circuit 2 has two arms including an arm at a side where switching elements S21 and S22 are disposed, and an arm at a side where switching elements S23 and S24 are disposed. In detailed description of the configuration of the full-bridge type, one end of the switching element S21 and one end of the switching element S22 are connected to each other at a connection point P10, and one end of the switching element S23 and one end of the switching element S24 are connected to each other at a connection point P8. Moreover, the other end of the switching element S21 and the other end of the switching element S23 are connected to each other at a connection point P6 via a connection changeover switch S5, and the other end of the switching element S22 and the other end of the switching element S24 are connected to each other at a connection point P7 via a connection changeover switch S6, and the other ends of the switching elements S21 and S23 and the other ends of the switching elements S22 and S24 are connected to the input terminals T1 and T2 respectively. According to such a configuration, the switching circuit 2 converts the input DC voltage $V_{in}$ applied between the input terminals T1 and T2 into an input AC voltage depending on drive signals (drive signals SG21 to SG24) supplied from the control section 7.

The switching elements S11 to S14 and S21 to S24 include switching elements such as a field effect transistors (MOS-FET; Metal Oxide Semiconductor-Field Effect Transistor) or IGBT (Insulated Gate Bipolar Transistor). When MOS-FET is used for the switching elements, the capacitors C11 to C14 and C21 to C24, and the diodes D11 to D14 and D21 to D24 can be configured by parasitic capacitance or parasitic diodes of the MOS-FET respectively. Moreover, the capacitors C11 to C14 and C21 to C24 can be configured by bonding capacitance of the diodes D11 to D14 and D21 to D24 respectively. In such configurations, the capacitors C11 to C14 and C21 to C24 and the diodes D11 to D14 and D21 to D24 need not be provided separately from the switching elements, consequently a circuit configuration can be simplified.

The connection changeover switch S5 is disposed between connection points P11 and P13, i.e., between the primary high-voltage line L1H and one of the two common connection points of an arm with the switching elements S13 and S14 and an arm with the switching elements S21 and S22. The connection changeover switch S6 is disposed between connection points P12 and P14, i.e., between the primary low-voltage line L1L and the other of the two common connection points mentioned above. The connection changeover switches S5 and S6 also include a switching element such as MOS-FET or IGBT. Again in the connection changeover switches S5 and S6, an on/off state is controlled by drive signals (drive signals SG5 and SG6) supplied from the control section 7 so that connection between current paths in the switching circuits 1 and 2 is changed, which is described in detail later.

The inductor Lr1 is connected to the connection point P5 at one end, and connected to the connection point P9 at the other end via a primary winding 31A of the transformer 3. That is, the inductor Lr1 is in H-bridge connection with a bridge circuit (switching circuit 1) including the switching elements S11 to S14. On the other hand, the inductor Lr2 is connected to the connection point P8 at one end, and connected to the connection point P10 at the other end via a primary winding 31B of the transformer 3. That is, the inductor Lr2 is in H-bridge connection with a bridge circuit (switching circuit 2) including the switching elements S21 to S24.

The transformer 3 has two primary windings 31A, 31B provided correspondingly to the switching circuits 1 and 2, and two secondary windings 32A, 32B, the primary windings having the number of turns equal to each other. Among them, the primary winding 31A is connected to the other end of the inductor Lr1 at one end, and connected to the connection point P9 at the other end. That is, the primary winding 31A is in H-bridge connection with the bridge circuit (switching circuit 1) including the switching elements S11 to S14. The primary winding 31B is connected to the other end of the inductor Lr2 at one end, and connected to the connection point P10 at the other end. That is, the primary winding 31B is in H-bridge connection with the bridge circuit (switching circuit 2) including the switching elements S21 to S24. On the other hand, one end of the secondary winding 32A and one end of the secondary winding 32B are connected to each other at a center tap CT being led to an output terminal T3 on an output line LO via a smoothing circuit 5. That is, the rectifier circuit 4 described later is a circuit of a center tap type. According to such a configuration, the transformer 3 steps down input AC voltages produced by the switching circuits 1 and 2, and outputs output AC voltages different in phase by 180 degrees from each other from respective ends of the secondary windings 32A and 32B. A level of step-down in this case is determined by a turn ratio between the primary windings 31A, 31B and the secondary windings 32A, 32B.

The rectifier circuit 4 is a circuit of a single-phase full-wave rectification type including a pair of rectifier diodes 4A and 4B. A cathode of the rectifier diode 4A is connected to the other end of the secondary winding 32A, and a cathode of the rectifier diode 4B is connected to the other end of the secondary winding 32B. Anodes of the rectifier diodes 4A and 4B are connected to each other, and connected to a ground line LG. That is, the rectifier circuit 4 is in a configuration of anode common connection of a center tap type, wherein respective half-wave periods of output AC voltages from the transformer 3 are individually rectified by the rectifier diodes 4A and 4B to obtain DC voltages respectively.

The rectifier diodes 4A and 4B may be configured by parasitic diodes of MOS-FET respectively. When the rectifier diodes 4A and 4B are configured by the parasitic diodes of MOS-FET respectively, the MOS-FET itself is preferably in an on state in synchronization with periods while the parasitic diodes of MOS-FET are conductive. This is because the AC voltages can be rectified with smaller voltage drop.

The smoothing circuit 5 includes a chalk coil 51 and an output smoothing capacitor $C_{out}$. The chalk coil 51 is disposed on an output line LO in an inserted manner, and connected to the center tap CT at one end, and connected to the output terminal T3 of the output line LO at the other end. The smoothing capacitor $C_{out}$ is connected between the output line LO (specifically, the other end of the chalk coil 51) and the ground line LG. At an end of the ground line LG, an output terminal T4 is provided. According to such a configuration, the smoothing circuit 5 smoothes the DC voltage rectified by the rectifier circuit 4 to produce an output DC voltage $V_{out}$, and supplies the voltage $V_{out}$ to the low-voltage battery (not shown) from output terminals T3 and T4.

The input voltage detection circuit 61 is disposed between the connection point P1 on the primary high-voltage line L1H and the connection point P2 on the primary low-voltage line L1L in an inserted manner, and connected to the control section 7. According to such a configuration, the input voltage detection circuit 61 detects the input DC voltage $V_{in}$ and outputs a voltage corresponding to a level of the input DC voltage $V_{in}$ to the control section 7. As a specific circuit configuration of the input voltage detection circuit 61, for example, a configuration is given, in which a voltage-dividing resistance (not shown) disposed between the connection points P1 and P2 is used to detect the input DC voltage $V_{in}$, and produce a corresponding voltage.

The output voltage detection circuit 62 is disposed between a connection point on the output line LO (specifically, a connection point between the other end of the chalk coil 51 and the output terminal T3) and the control section 7 in an inserted manner. According to such a configuration, the output voltage detection circuit 62 detects the output DC voltage $V_{out}$ and outputs a voltage corresponding to a level of the output DC voltage $V_{out}$ to the control section 7. Similarly as in the case of the input voltage detection circuit 61, as a specific circuit configuration of the output voltage detection circuit 62, for example, a configuration is given, in which a voltage-dividing resistance disposed between the connection point on the output line LO and ground (not shown) is used to detect the output DC voltage $V_{out}$, and produce a corresponding voltage.

Figures 2, 3:
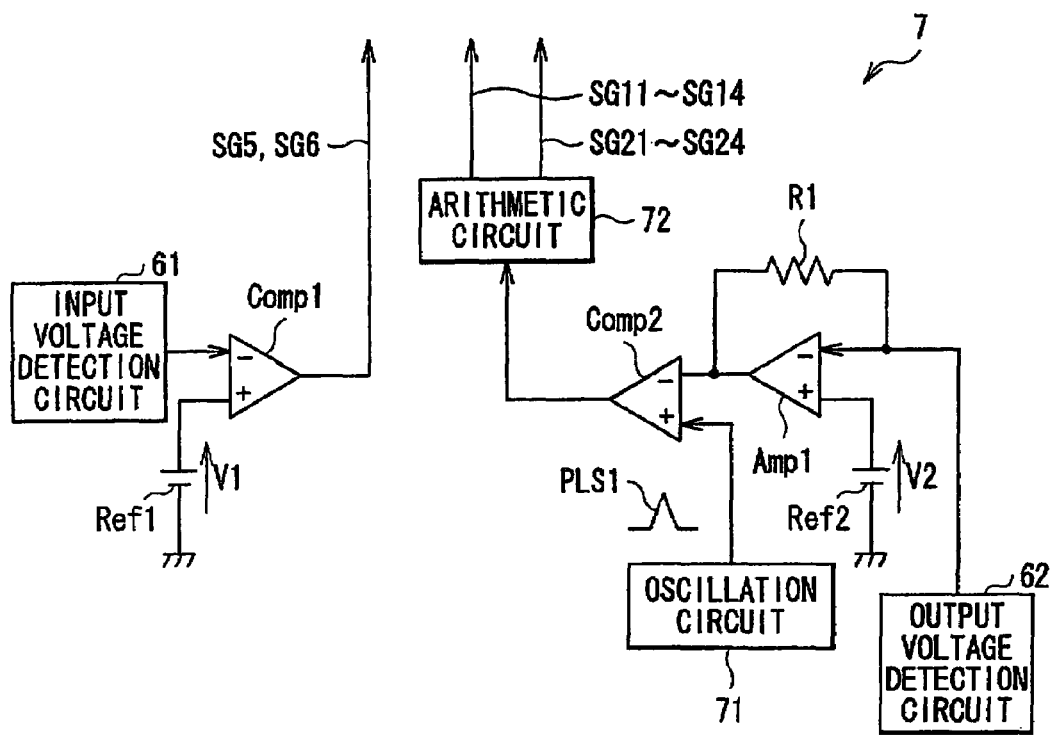
FIG. 2 is a circuit diagram showing a configuration of a control section in FIG. 1.
FIG. 3 is a view for explaining difference between a series connection condition and a parallel connection condition.

Here, the control section 7 is described in detail with reference to FIGS. 2 and 3. FIG. 2 shows a circuit configuration of the control section 7, and FIG. 3 shows detail of connection changeover control of a current path by the control section 7.

As shown in FIG. 2, the control section 7 has an oscillation circuit 71, an arithmetic circuit 72, comparators Comp1 and Comp2, a differential amplifier (error amplifier) Amp1, a reference power supply Ref1 for the comparator Comp1, a reference power supply Ref2 for the differential amplifier Amp1, and a resistor R1. A plus input terminal of the comparator Comp1 is connected to an output terminal of the input voltage detection circuit 61, a minus input terminal is connected to an end of the reference power supply Ref1, and an output terminal is connected to the connection changeover switches S5 and S6. A plus input terminal of the differential amplifier Amp1 is connected to one end to the reference power supply Ref2, a minus input terminal is connected to an output terminal of the output voltage detection circuit 62, and an output terminal is connected to a minus input terminal of the comparator Comp2. A plus input terminal of the comparator Comp2 is connected to an output terminal of the oscillator 71, and an output terminal is connected to an input terminal of the arithmetic circuit 72. Two output terminals of the arithmetic circuit 72 are connected to the switching circuits 1 and 2 respectively. The resistor R1 is disposed between the minus input terminal and output terminal of the differential amplifier Amp1, and the other ends of the reference power supplies Ref1 and Ref2 are grounded respectively.

The comparator Comp1 compares between reference potential V1 from the reference power supply Ref1 corresponding to potential of a threshold voltage $V_{th}$, and potential of a voltage corresponding to the input DC voltage $V_{in}$ outputted from the input voltage detection circuit 61, and outputs drive signals SG5 and SG6 for the connection changeover switches S5 and S6 based on a result of the comparison. Specifically, when the input DC voltage $V_{in}$ is higher than the threshold voltage $V_{th}$, the drive signals SG5 and SG6 are in a "L" level, and on the other hand, when the input DC voltage $V_{in}$ is conversely lower than the threshold voltage $V_{th}$, the drive signals SG5 and SG6 are in a "H" level.

The differential amplifier Amp1 amplifies potential difference between reference potential V2 from the reference power supply Ref2, and potential of a voltage corresponding to the output DC voltage $V_{out}$ outputted from the output voltage detection circuit 62, and outputs the amplified potential difference.

The comparator Comp2 compares potential of a pulse voltage PLS1 outputted from the oscillation circuit 71 with potential of an output voltage from the differential amplifier Amp1, and outputs a pulse voltage as an origin of drive signals SG11 to SG14 and SG21 to SG24 for the switching elements S11 to S14 and S21 to S24 based on a result of the comparison. Specifically, when the output voltage from the differential amplifier Amp1 is higher than the pulse voltage PLS1, output of the comparator is in the "L" level, and on the other hand, when the output voltage from the differential amplifier Amp1 is conversely lower than the pulse voltage PLS1, the input DC output of the comparator is in the "H" level.

The arithmetic circuit 72 performs logic operation to a signal of a pulse voltage outputted from the comparator Comp2, and outputs the drive signals SG11 to SG14 and SG21 to SG24 for the switching elements S11 to S14 and S21 to S24.

According to such a configuration, the control section 7 controls operation of the switching elements S11 to S14 in the switching circuit 1, and operation of the switching elements S21 to S24 in the switching circuit 2 respectively. Specifically, the switching elements S11 to S14 and S21 to S24 are subjected to on/off control by the drive signals SG11 to SG14 and SG21 to SG24, so that the output DC voltage $V_{out}$ is stabilized (kept constant). More specifically, when the output DC voltage $V_{out}$ detected by the output voltage detection circuit 62 is increased, duty ratios of the drive signals SG11 to SG14 and SG21 to SG24 outputted from the control section 7 are reduced, and when the detected output DC voltage $V_{out}$ is conversely decreased, the duty ratios of the drive signals SG11 to SG14 and SG21 to SG24 are increased, so that the output DC voltage $V_{out}$ is kept constant.

Moreover, the control section 7 controls operation of the connection changeover switches S5 and S6 by the drive signals SG5 and SG6 according to a level of a voltage depending on the input DC voltage $V_{in}$ outputted form the input voltage detection circuit 61, so that a connection condition between a current path (first current path) passing the switching circuit 1 and the primary winding 31A, and a current path (second current path) passing the switching circuit 2 and the primary winding 31B is changed.

Specifically, as shown in FIG. 3, first, when the input DC voltage $V_{in}$ detected by the input voltage detection circuit 61 is lower than the predetermined threshold voltage $V_{th}$, the control section 7 controls the connection changeover switches S5 and S6 to be on. Then, the first and second current paths are in a parallel connection state. On the other hand, when the detected, input DC voltage $V_{in}$ is not lower than the predetermined threshold voltage $V_{th}$, the control section 7 controls the connection changeover switches S5 and S6 to be off. Then, the first and second current paths are in a series connection state. A turn ratio (np/ns) of the number of turns np of the primary windings 31A, 31B to the number of turns ns of the secondary windings 32A, 32B in the case of the series connection state (turn ratio=2n) is twice as large as that in the case of the parallel connection state (turn ratio=n). Detail of such connection changeover control by the control section 7 is described later.

Here, the switching elements S11 to S14 and the switching elements S21 to S24 correspond to a specific example of the "four switching elements" in an embodiment of the invention, and the switching circuits 1 and 2 correspond to a specific example of the "two switching circuits" in an embodiment of the invention. The rectifier circuit 4 and the smoothing circuit 5 correspond to a specific example of the "output circuit" in an embodiment of the invention, and the control section 7 corresponds to a specific example of the "drive circuit" and the "control section" in an embodiment of the invention. The inductors Lr1 and Lr2 correspond to a specific example of the "two inductors" in an embodiment of the invention. The connection switching switches S5 and S6 correspond to a specific example of the "connection switching elements" in an embodiment of the invention, and the connection changeover switches S5 and S6, input voltage detection circuit 61 and control section 7 correspond to a specific example of the "connection switching unit" in an embodiment of the invention. The input terminals T1 and T2 correspond to a specific example of the "input terminal pair" in an embodiment of the invention, the primary high-voltage line L1H corresponds to a specific example of the "plus connection line" in an embodiment of the invention, and the primary low-voltage line L1L corresponds to a specific example of the "minus connection line" in an embodiment of the invention. The arm with the switching elements S11 and S12 and the arm with the switching elements S13 and S14 correspond to a specific example of the "a couple of arms" in an embodiment of the invention. The arm with the switching elements S21 and S22 and the arm with the switching elements S23 and S24 correspond to a specific example of the "a couple of arms" in an embodiment of the invention. Among them, the arm with the switching elements S13 and S14 and the arm with the switching elements S21 and S22 correspond to a specific example of the "one arm" in an embodiment of the invention, respectively. The connection point P11 corresponds to a specific example of the "first common connection point" in an embodiment of the invention, and the connection point P12 corresponds to a specific example of the "second common connection point" in an embodiment of the invention.

Next, operation of the switching power supply unit having a configuration as above is described. First, basic operation of the switching power supply unit is described.

The switching circuits 1 and 2 produce input AC voltages by switching the input DC voltage $V_{in}$ supplied from the high-voltage battery 10 via the input terminals T1 and T2, and supply them to the primary windings 31A and 31B of the transformer 3. Transformed (here, stepped-down) output AC voltage is drawn out from the secondary windings 32A and 32B of the transformer 3.

The rectifier circuit 4 rectifies the output AC voltage by the rectifier diodes 4A and 4B. Thus, rectified output is produced between the center tap CT (output line LO) and a connection point between the rectifier diodes 4A and 4B (ground line LG).

The smoothing circuit 5 smoothes the rectified outputs produced between the center-tap CT and the connection point between each of the rectifier diodes 4A and 4B, and outputs the output DC voltage $V_{out}$ from the output terminals T3 and T4. Then, the output DC voltage $V_{out}$ is supplied to the not-shown low-voltage battery, and the load 8 is driven.

Next, connection changeover operation between current paths as a main feature of an embodiment of the invention is described in detail with reference to FIGS. 4 to 12.

Figure 4:
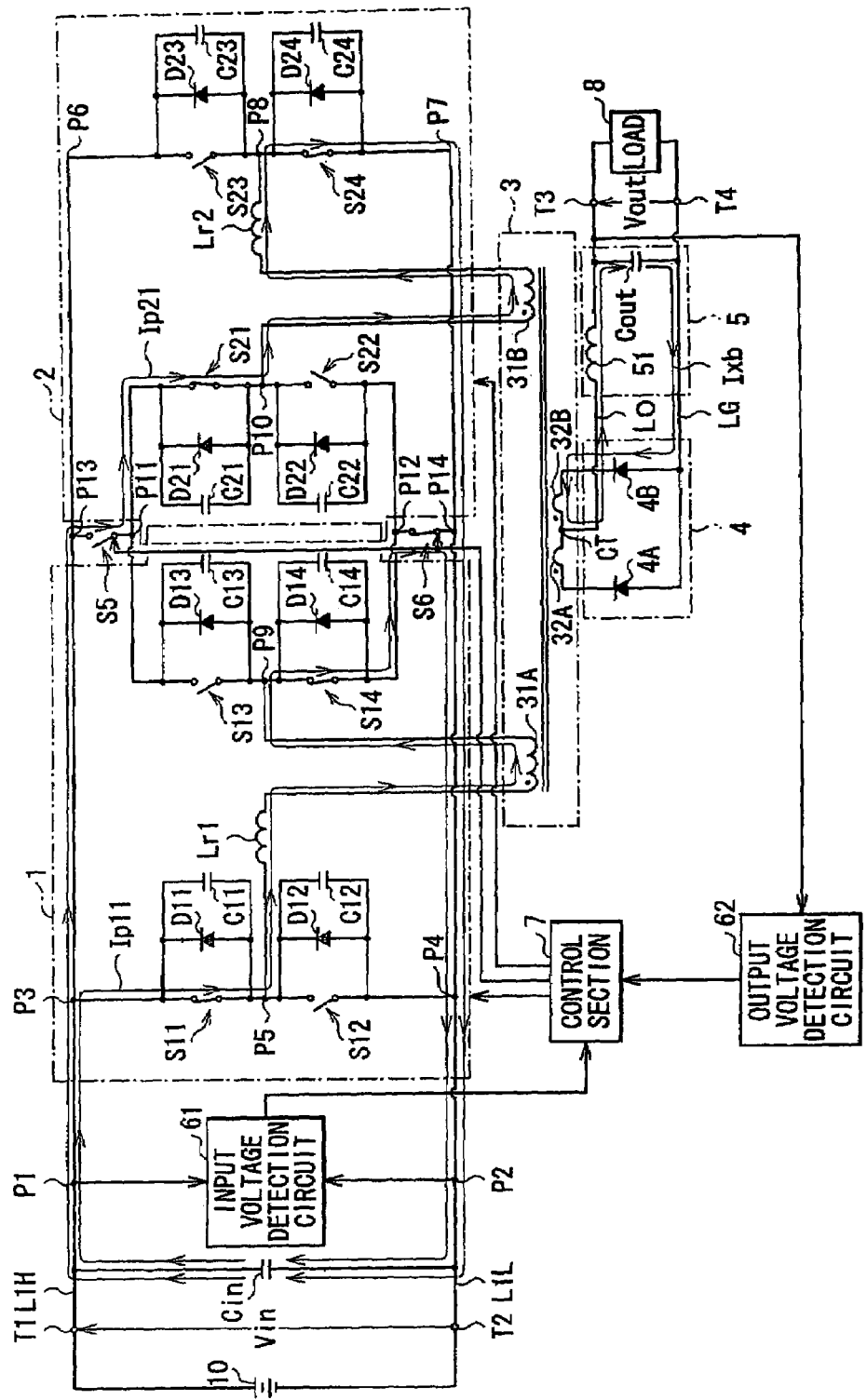
FIG. 4 is a circuit diagram for explaining operation in the parallel connection condition of the switching power supply unit of FIG. 1.
Figure 5:
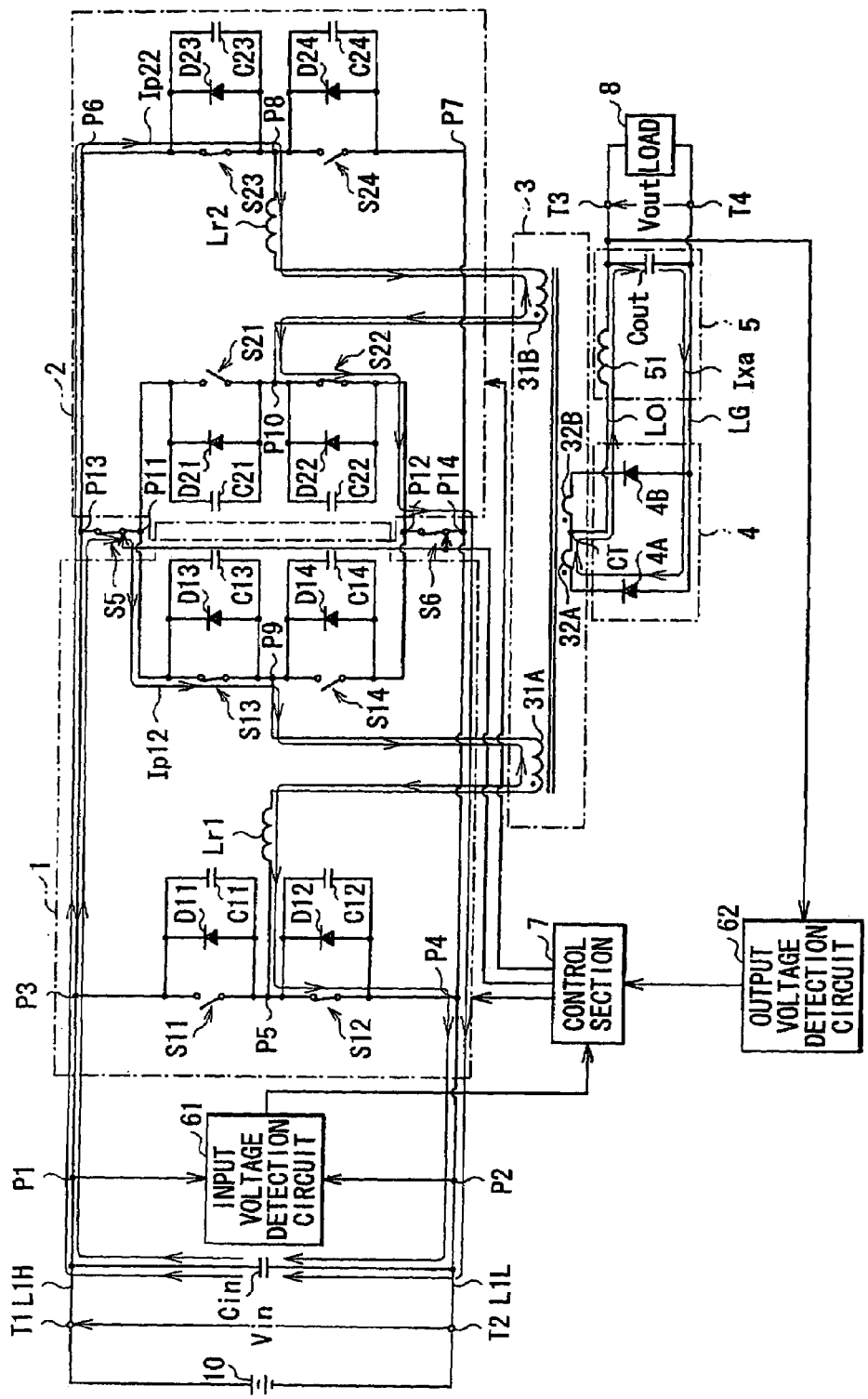
FIG. 5 is a circuit diagram for explaining operation in the parallel connection condition following FIG. 4.
Figure 6:
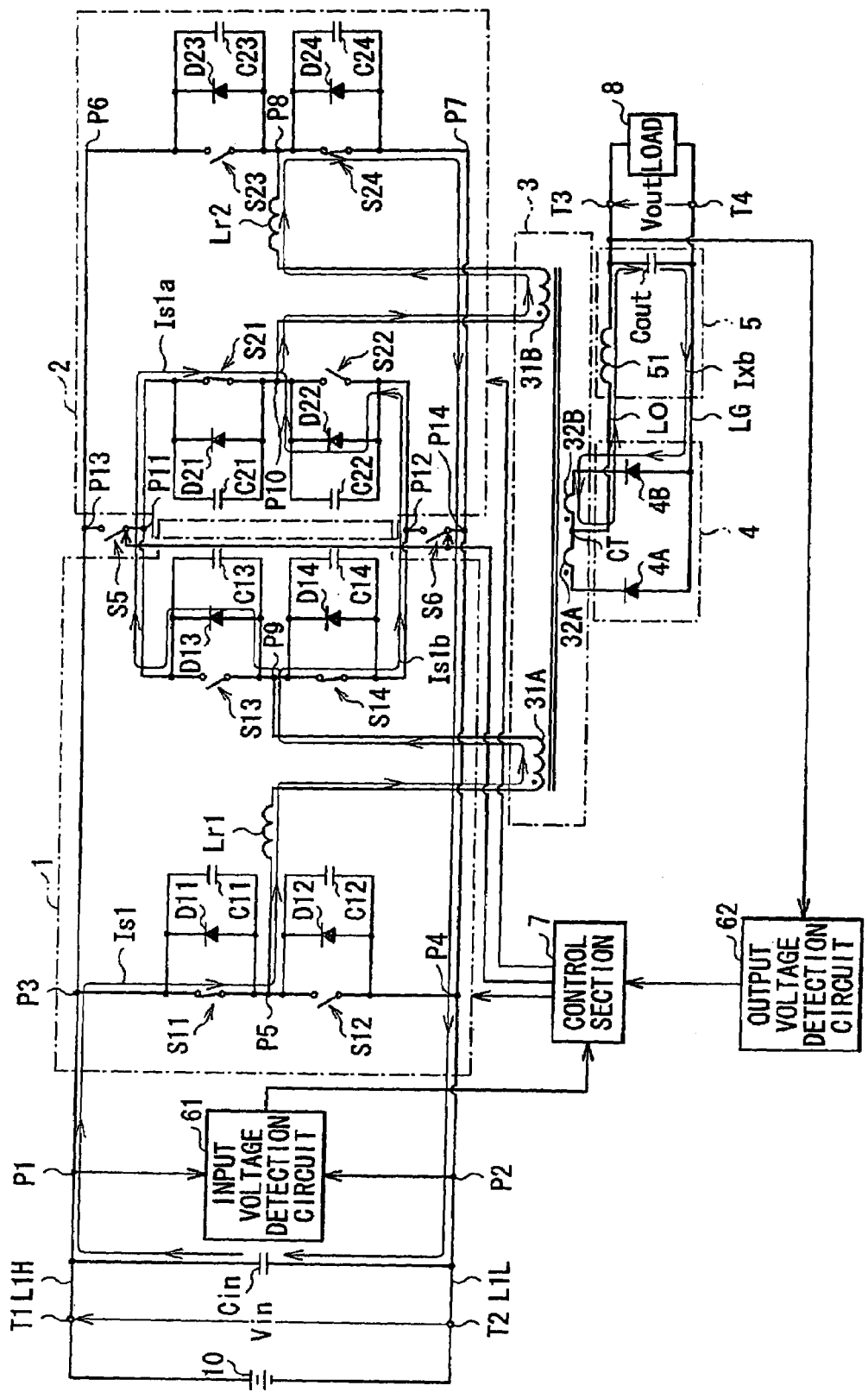
FIG. 6 is a circuit diagram for explaining operation in the series connection condition of the switching power supply unit of FIG. 1.
Figure 7:
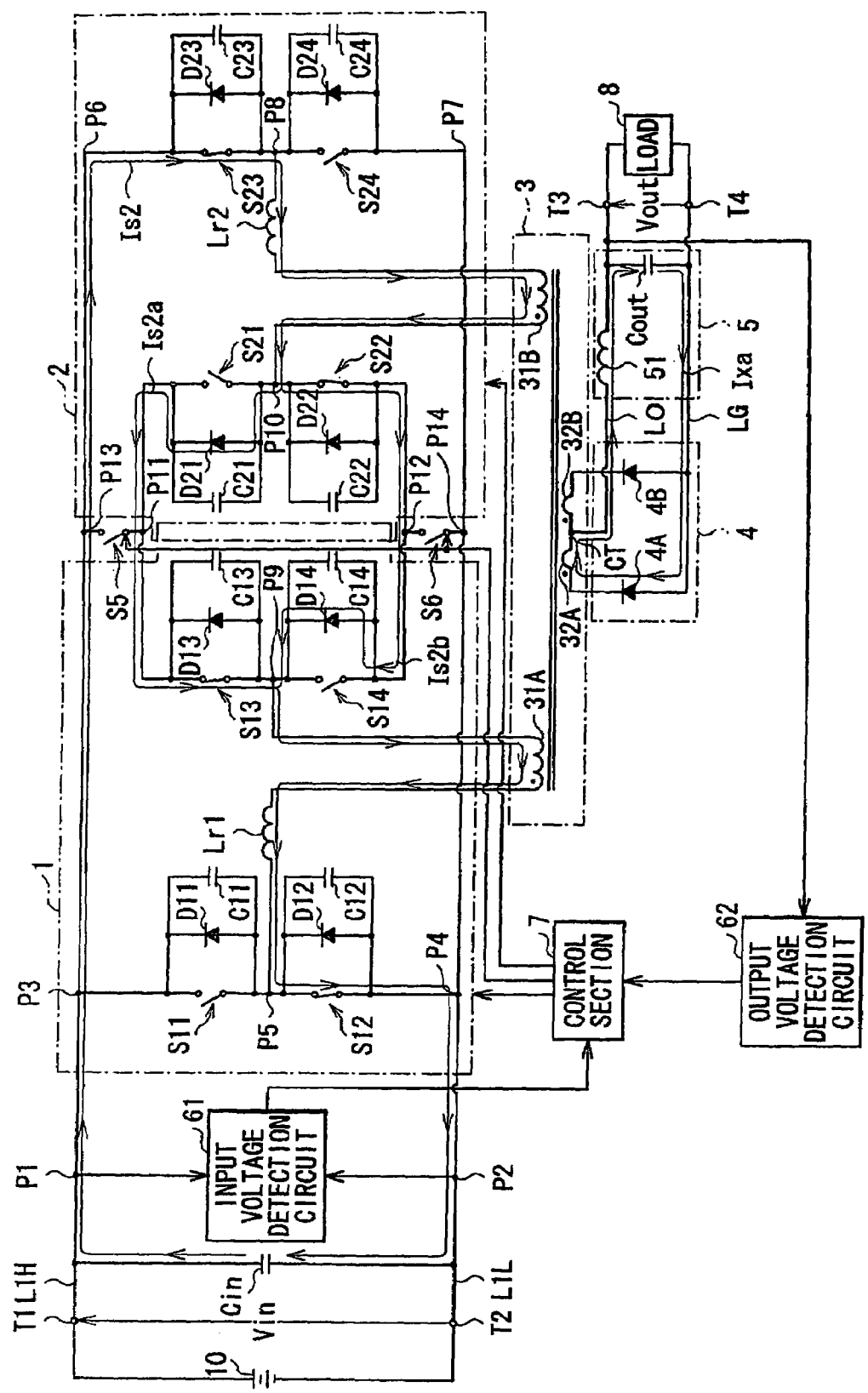
FIG. 7 is a circuit diagram for explaining operation in the series connection condition following FIG. 6.
Figure 8:
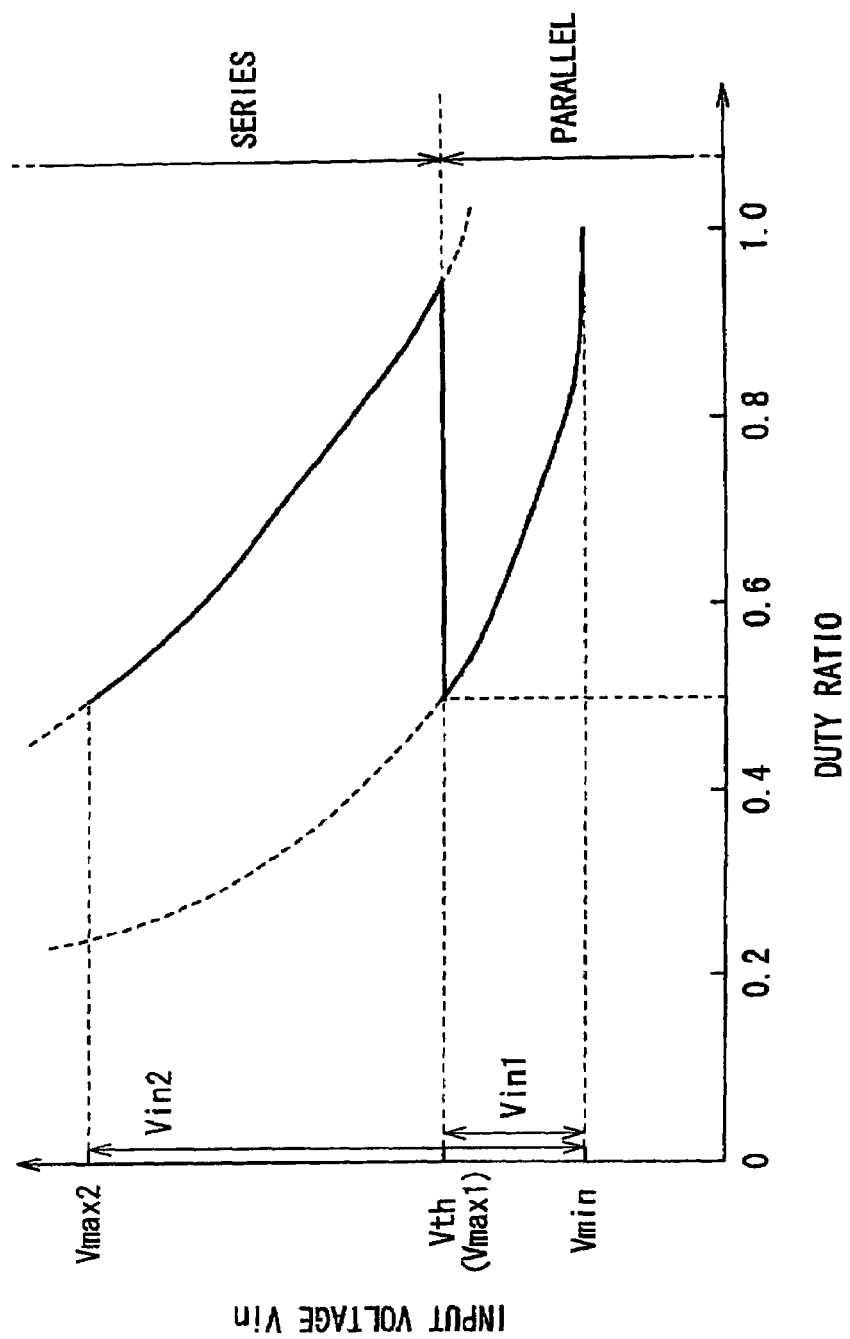
FIG. 8 is a characteristic view showing a relationship between an input voltage, a duty ratio, and a connection condition in the control section of FIG. 2.

FIGS. 4 to 7 show operation conditions of the switching power supply unit of the embodiment respectively. Among them, FIG. 4 and FIG. 5 show a case that the first current path and the second current path are in the parallel connection state, and FIG. 6 and FIG. 7 show a case that they are in the series connection state, respectively. FIG. 8 shows a relationship between the input voltage $V_{in}$ and a duty ratio (on-duty ratios of the drive signals SG11 to SG14 and SG21 to SG24) in each of the parallel and series connection states.

First, the parallel connection state as shown in FIG. 4 and FIG. 5 corresponds to a case that the input voltage $V_{in}$ detected by the input voltage detection circuit 61 is lower than the threshold voltage $V_{th}$, for example, as shown in FIG. 8. In this case, the control section 7 sets the connection changeover switches S5 and S6 to be on respectively (see FIG. 3), so that the switching circuits 1 and 2 perform parallel operation independent of each other.

Specifically, in an operation condition as shown in FIG. 4, a current path Ip11 (corresponding to the first current path) passing the input smoothing capacitor $C_{in}$, switching element S11, inductor Lr1, primary winding 31A, switching element S14, and connection changeover switch S6, and a current path Ip21 (corresponding to the second current path) passing the input smoothing capacitor $C_{in}$, connection changeover switch S5, switching element S21, primary winding 31B, inductor Lr2, and switching element S24 are in the parallel connection state to each other.

In an operation condition as shown in FIG. 5, a current path Ip12 (corresponding to the first current path) passing the input smoothing capacitor $C_{in}$, connection changeover switch S5, switching element S13, primary winding 31A, inductor Lr1, and switching element S12, and a current path Ip22 (corresponding to the second current path) passing the input smoothing capacitor $C_{in}$, switching element S23, inductor Lr2, primary winding 31B, switching element S22, and connection changeover switch S6 are in the parallel connection state to each other.

Here, since the two primary windings 31A and 31B correspond to the two switching circuits 1 and 2, and have the number of turns equal to each other, a turn ratio between the number of turns np of the primary windings 31A, 31B and the number of turns ns of the secondary windings 32A, 32B in the parallel connection state is simply (np/ns) (which is assumed as n) (see FIG. 3).

On the other hand, the series connection state as shown in FIG. 6 and FIG. 7 corresponds to a case that the input voltage $V_{in}$ detected by the input voltage detection circuit 61 is higher than the threshold voltage $V_{th}$, for example, as shown in FIG. 8. In this case, the control section 7 sets the connection changeover switches S5 and S6 to be off respectively (see FIG. 2), so that the switching circuits 1 and 2 perform series operation coupled with each other.

Specifically, in an operation condition as shown in FIG. 6, a current path (corresponding to the first current path) passing the input smoothing capacitor $C_{in}$, switching element S11, inductor Lr1, primary winding 31A, and switching element S14, and a current path (corresponding to the second current path) passing the switching element S21, primary winding 31B, inductor Lr2, and switching element S24 are coupled with each other by a current path Is1a passing a diode D13 and the switching element S21 and a current path Is1b passing the switching element S14 and a diode D22, so that they are in a series connection state to each other. That is, a current path Is1 is formed, the path passing the input smoothing capacitor $C_{in}$, switching element S11, inductor Lr1, primary winding 31A, switching element S14 and diode D22 (or diode D13 and switching element S21), primary winding 31B, inductor Lr2, and switching element S24.

In the operation condition as shown in FIG. 7, a current path (corresponding to the second current path) passing the input smoothing capacitor $C_{in}$, switching element S23, inductor Lr2, primary winding 31B, and switching element S22, and a current path (corresponding to the first current path) passing switching element S13, primary winding 31A, inductor Lr1, and switching element S12 are coupled with each other by a current path Is2a passing a diode D21 and the switching element S13 and a current path Is2b passing the switching element S22 and a diode D14, so that they are in a series connection state to each other. That is, a current path Is2 is formed, the path passing the input smoothing capacitor $C_{in}$, switching element S23, inductor Lr2, primary winding 31B, switching element S22 and diode D14 (or diode D21 and switching element S13), primary winding 31A, inductor Lr1, and switching element S12.

Here, since the two primary windings 31A and 31B in the transformer 3 correspond to the two switching circuits 1 and 2 respectively, and have the number of turns equal to each other, a turn ratio between the number of turns np of the primary windings 31A, 31B and the number of turns ns of the secondary windings 32A, 32B in the series connection state is 2*(np/ns)=2n (see FIG. 3). That is, a turn ratio in the series state condition is larger (double) compared with the case of the parallel connection state (turn ratio=n).

Accordingly, as shown in FIG. 8, when the input voltage $V_{in}$ is high, the series connection state enables the on-duty ratio of the drive signals SG11 to SG14 and SG21 to SG24 to be kept higher compared with the parallel connection state, and a range of the input voltage $V_{in}$ in which a constant output voltage $V_{out}$ can be kept is increased through such connection changeover control (an input voltage range $V_{in}1$ from a voltage $V_{min}$ to a voltage $V_{max1}$ is widened to an input voltage range $V_{in}2$ from a voltage $V_{min}$ to a voltage $V_{max2}$).

Figure 9:
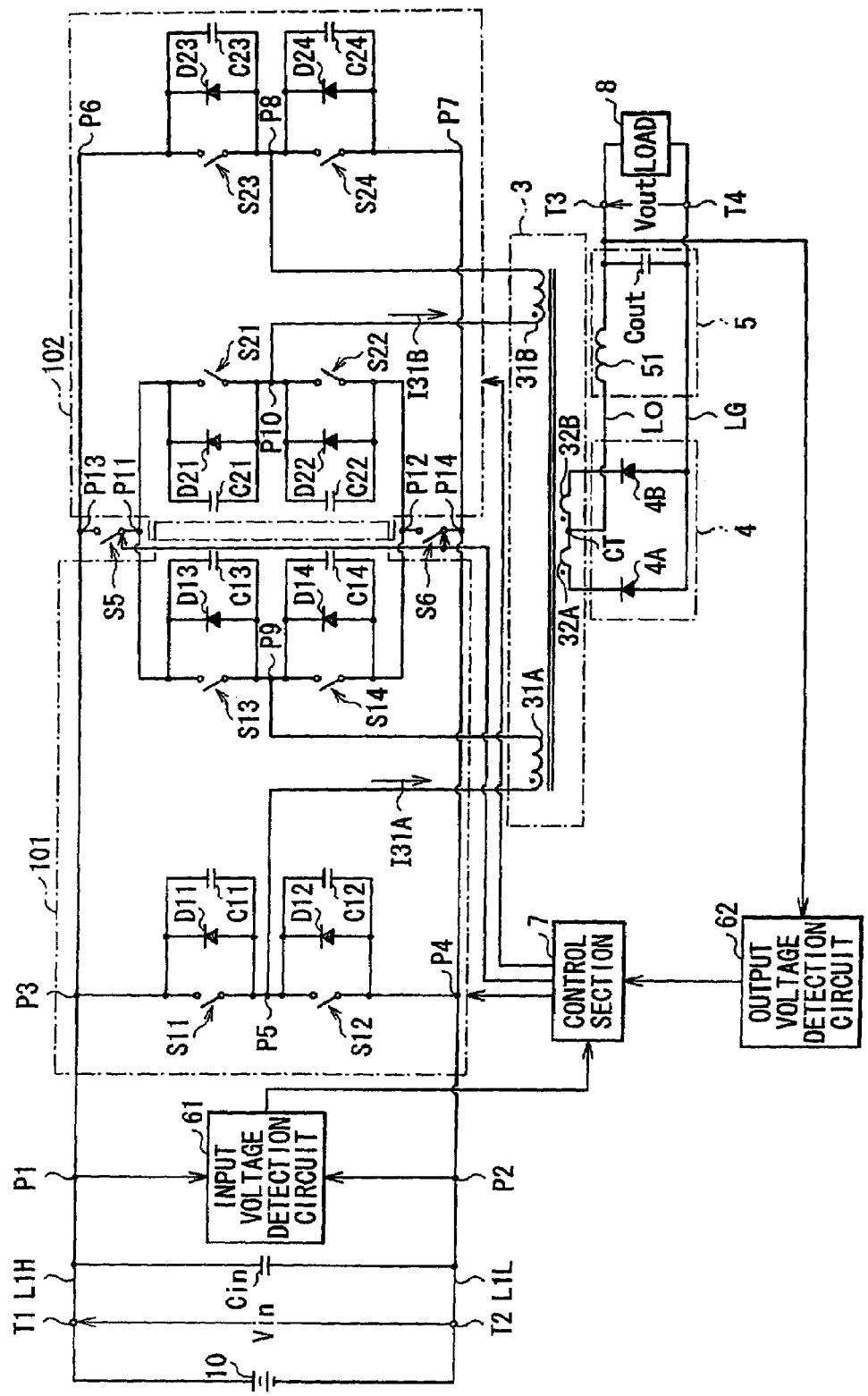
FIG. 9 is a circuit diagram showing a configuration of a switching power supply unit according to a comparative example.

Next, description is made on presence of a surge current in circuits in the switching power supply unit of the embodiment and a switching power supply unit of a comparative example, with reference to FIGS. 9 to 11, while comparing both cases with each other.

Here, FIG. 9 shows a configuration of a switching power supply unit according to a comparative example. Specifically, in the configuration, the inductors Lr1 and Lr2 are removed from the switching power supply unit of the embodiment as shown in FIG. 1. FIG. 10 and FIG. 11 show timing waveforms of currents flowing through the primary windings 31A and 31B of the transformer 3 in the switching power supply units according to the comparative example and the embodiment respectively, and (a) shows drive signals SG5 and SG6 of the connection changeover switches S5 and S6, (b) shows a current I31A flowing through the primary winding 31A, and (c) shows a current I31B flowing through the primary winding 31B, respectively. In the currents I31A and I31B, a direction of an arrow shown in FIG. 9 is assumed as a positive direction.

First, in the comparative example shown in FIG. 10, it is found that when the drive signals SG5 and SG6 are in the "H" level, that is, the connection changeover switches S5 and S6 are on so that the current paths are in the parallel connection state (a state before timing t101), surge waveforms as shown by signs G11 to G13 and G21 to G23 appear in the current waveforms of the currents I31A and I31B. The surge waveforms are due to shift in timing between the drive signals SG11 to SG14 and SG21 to SG24, that is, shift in operation timing between switching circuits 101 and 102 operating in synchronization with each other. If the timing is perfectly synchronized in the circuits, the surge waveforms may not appear. However, this is actually difficult because variation in manufacturing occurs between switching elements, or parasitic resistance or parasitic capacitance of wiring exists. Here, in the comparative example, since the inductors Lr1 and Lr2 are not provided as described before, tolerance for such shift in operation timing is small, consequently such surge current is produced even by slight shift.

On the contrary, in the embodiment shown in FIG. 11, the surge waveforms do not appear in current waveforms of currents I31A and I31B even in the case of the parallel connection state before the timing t1. The reason for this is that in the switching power supply unit of the embodiment, since the two inductors Lr1 and Lr2 are provided correspondingly to the two switching circuits 1 and 2 respectively as described before, a current is gently changed in a circuit by an effect of keeping a level of a current by the inductors, as a result, tolerance for shift in operation timing is increased. In this way, in the embodiment having the inductors Lr1 and Lr2, the tolerance for shift in timing between the switching circuits 1 and 2 in parallel operation is increased, consequently production of surge current is avoided.

As above, in the embodiment, the transformer 3 having the two primary windings 31A and 31B having the number of turns equal to each other, and two inductors Lr1 and Lr2 are provided correspondingly to the two switching circuits respectively, and by using the input voltage detection circuit 61, control section 7 and connection changeover switches S5 and S6, when the input DC voltage $V_{in}$ is smaller than the predetermined threshold voltage $V_{th}$, the first current path and the second current path are connected in parallel to each other, and when the input DC voltage $V_{in}$ is larger than the threshold voltage $V_{th}$, the first current path and the second current path are connected in series to each other, therefore the turn ratio (=np/ns) between the primary windings 31A, 31B and the secondary windings 32A, 32B can be increased, and currents can be gently changed in the circuits in the case of series connection compared with the case of parallel connection. Accordingly, the turn ratio can be changed depending on a level of the input DC voltage $V_{in}$, and tolerance for shift in timing between the switching circuits 1 and 2 can be increased, consequently an input voltage range can be widened while suppressing production of the surge current.

Moreover, by suppressing production of the surge current, loss in each element in the circuits can be reduced, and efficiency of the unit can be improved. Furthermore, by reducing the loss, heat generation in the element can be also suppressed. Furthermore, by suppressing production of the surge current, an element having small current capacity can be used, consequently component price can be reduced, in addition, size of the unit as a whole can be reduced.

Furthermore, since the switching elements S11 to S14 and S21 to S24 perform switching operation (on/off operation) at any time in either condition of the parallel connection and the series connection, the control section 7 can easily control the switching elements S11 to S14 and S21 to S24 compared with the cases of third and fourth embodiments as described later. That is, the switching elements need not to be subjected to mode changeover between an operation mode of fixing the switching elements to be on or off at any time and an operation mode of the on/off switching operation. Consequently, connection changeover between the parallel connection state and the series connection state can be performed only by control of the connection changeover switches S5 and S6.

In the embodiment, while description was made on a case that in the respective switching elements S11 to S14 and S21 to S24 in the switching circuits 1 and 2, on/off operation was performed in synchronization with each other between the switching elements S11 and S14 or switching elements S12 and S13, and the switching elements S21 and S24 or switching elements S22 and S23, the switching elements may perform phase shift operation to one another (phase difference φ and dead time Td), for example, as shown between timing t0 and timing t10 (operation for 1 period) of (A) to (E) in FIG. 12 and FIG. 13 respectively. In the case of such a configuration, the inductors Lr1, Lr2 and capacitors C11 to C14 and C21 to C24 configure an LC resonance circuit, and perform resonance operation. Accordingly, the switching elements S11 to S14 and S21 to S24 perform so-called ZVS (Zero Volt Switching) operation respectively, and consequently suppression of short loss in the switching elements is obtained in addition to the advantages of the embodiment, consequently efficiency of the unit can be further improved.

Second Embodiment

Next, a second embodiment of the invention is described.

Figure 14:
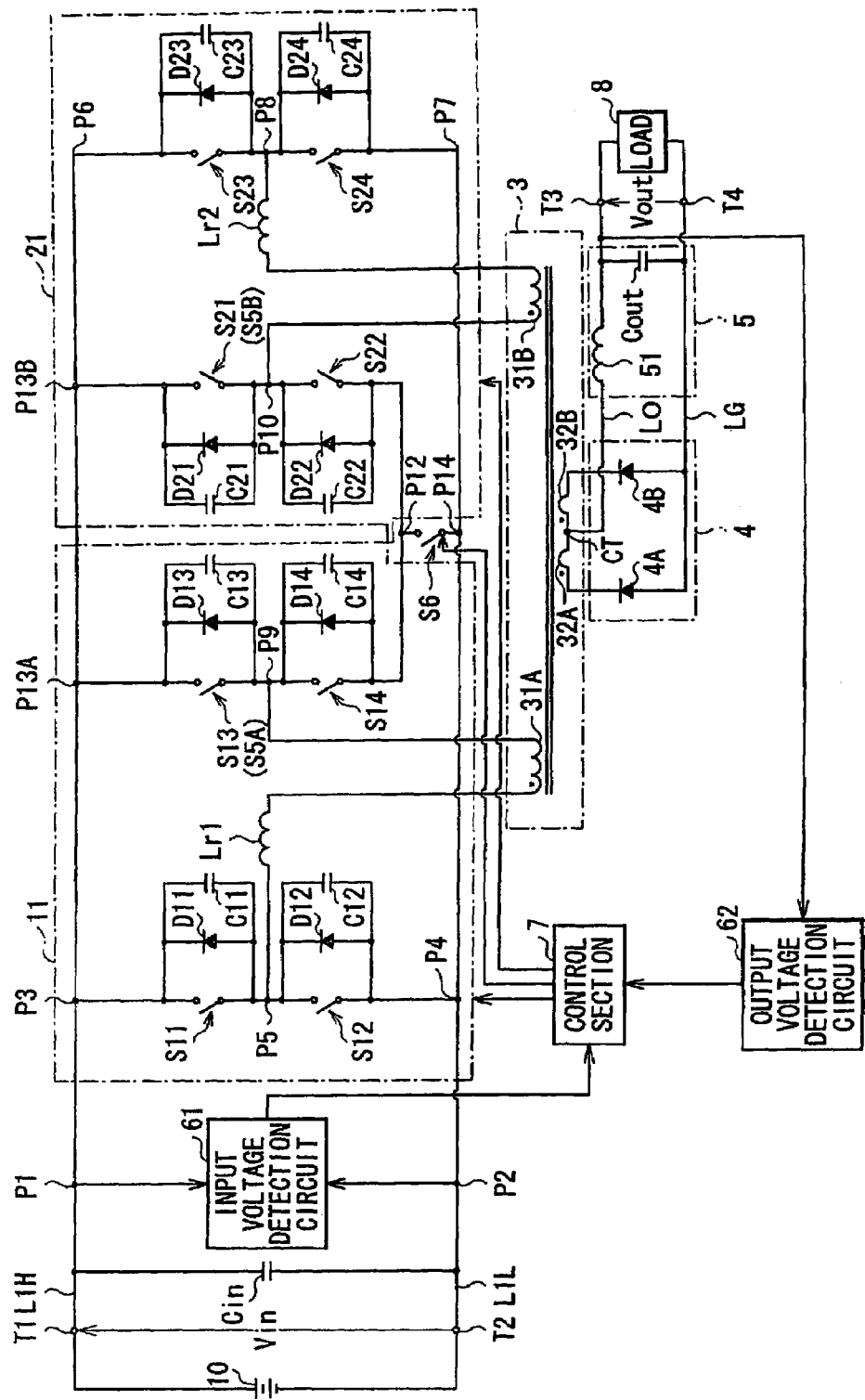
FIG. 14 is a circuit diagram showing a configuration of a switching power supply unit according to a second embodiment of the invention.

FIG. 14 shows a configuration of a switching power supply unit according to the embodiment. In the figure, the same components as components shown in FIG. 1 are marked with the same references, and appropriately omitted to be described. In the switching power supply unit, the connection changeover switch S5 is removed from the switching power supply unit of FIG. 1, and the other ends of the switching elements S13 and S21 are connected to the primary high-voltage line L1H at connection points P13A and P13B, and switching circuits 11 and 21 are provided in place of the switching circuits 1 and 2.

A connection point P12 in FIG. 14 corresponds to one specific example of the "common connection point" in an embodiment of the invention.

According to such a configuration, in the switching power supply unit of the embodiment, the switching elements S13 and S21 in the switching circuits 11 and 21 further operate as connection changeover switches (connection changeover switches S5A and S5B).

Figure 15:
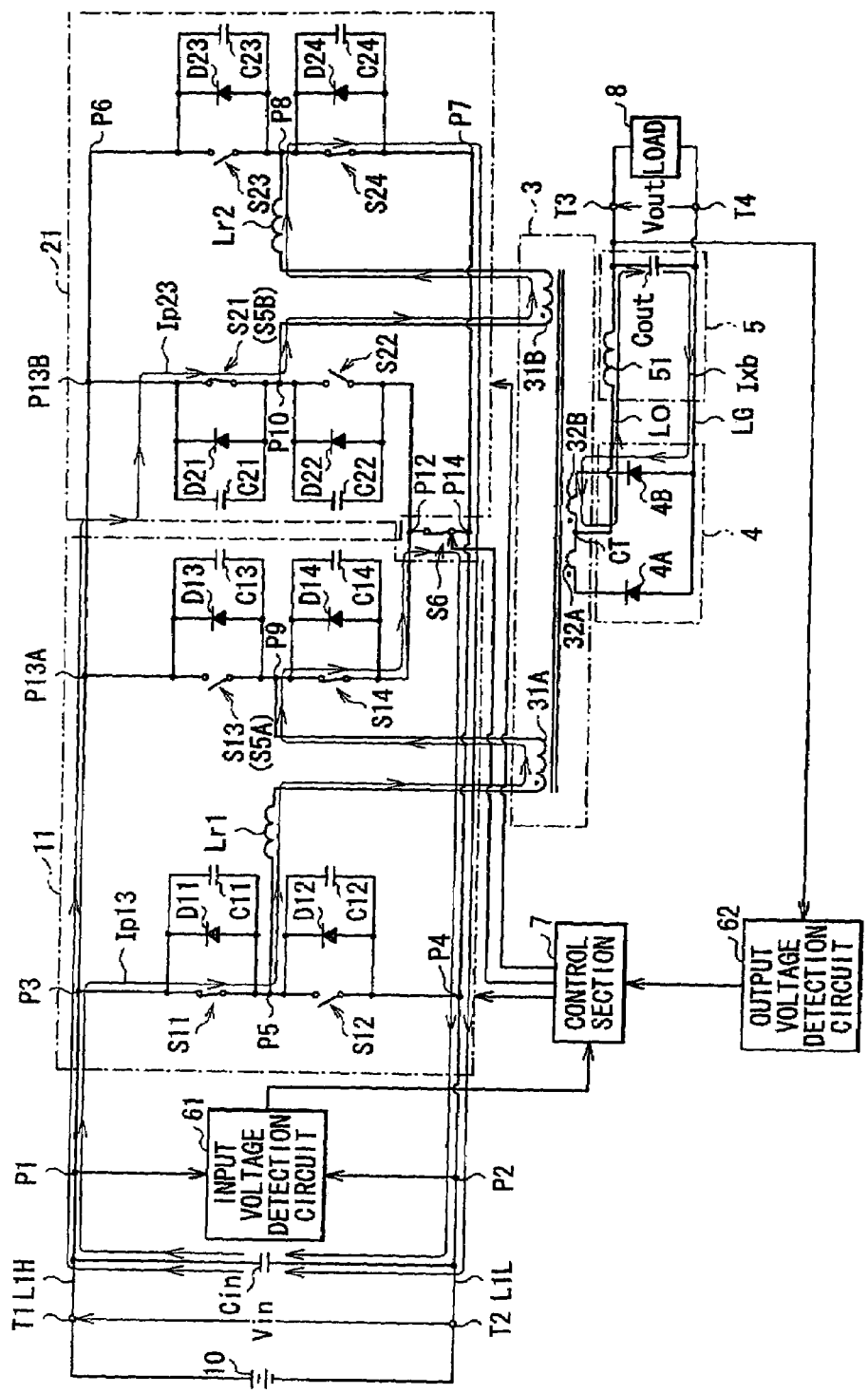
FIG. 15 is a circuit diagram for explaining operation in the parallel connection condition of the switching power supply unit of FIG. 14.
Figure 16:
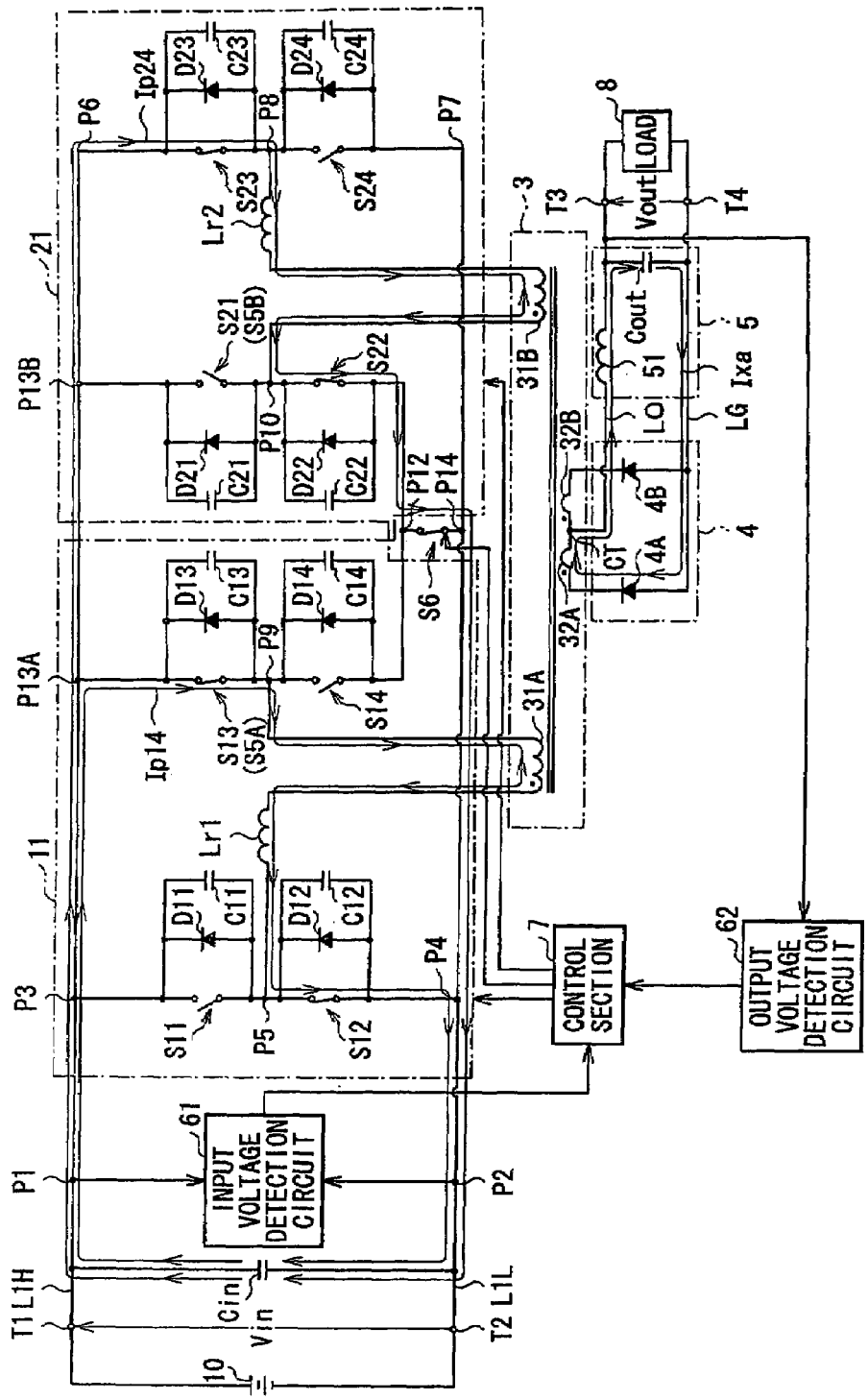
FIG. 16 is a circuit diagram for explaining operation in the parallel connection condition following FIG. 15.

Specifically, in parallel connection state as shown in FIG. 15 and FIG. 16, while the control section 7 sets the connection changeover switch S6 to be on, connection changeover switches S5A and S5B (switching elements S13 and S21) simply perform on/off operation respectively, and thus the switching circuits 11 and 21 perform parallel operation independent of each other as the first embodiment.

More specifically, in an operation condition as shown in FIG. 15, a current path Ip13 (corresponding to the first current path) passing the input smoothing capacitor $C_{in}$, switching element S11, inductor Lr1, primary winding 31A, switching element S14, and connection changeover switch S6, and a current path Ip23 (corresponding to the second current path) passing the input smoothing capacitor $C_{in}$, switching element S21 (connection changeover switch S5B), primary winding 31B, inductor Lr2, and switching element S24 are in the parallel connection state to each other.

In an operation condition as shown in FIG. 16, a current path Ip14 (corresponding to the first current path) passing the input smoothing capacitor $C_{in}$, switching element S13 (connection changeover switch S5A), primary winding 31A, inductor Lr1, and switching element S12 and a current path Ip24 (corresponding to the second current path) passing the input smoothing capacitor $C_{in}$, switching element S23, inductor Lr2, primary winding 31B, switching element S22, and connection changeover switch S6 are in the parallel connection state to each other.

Figure 17:
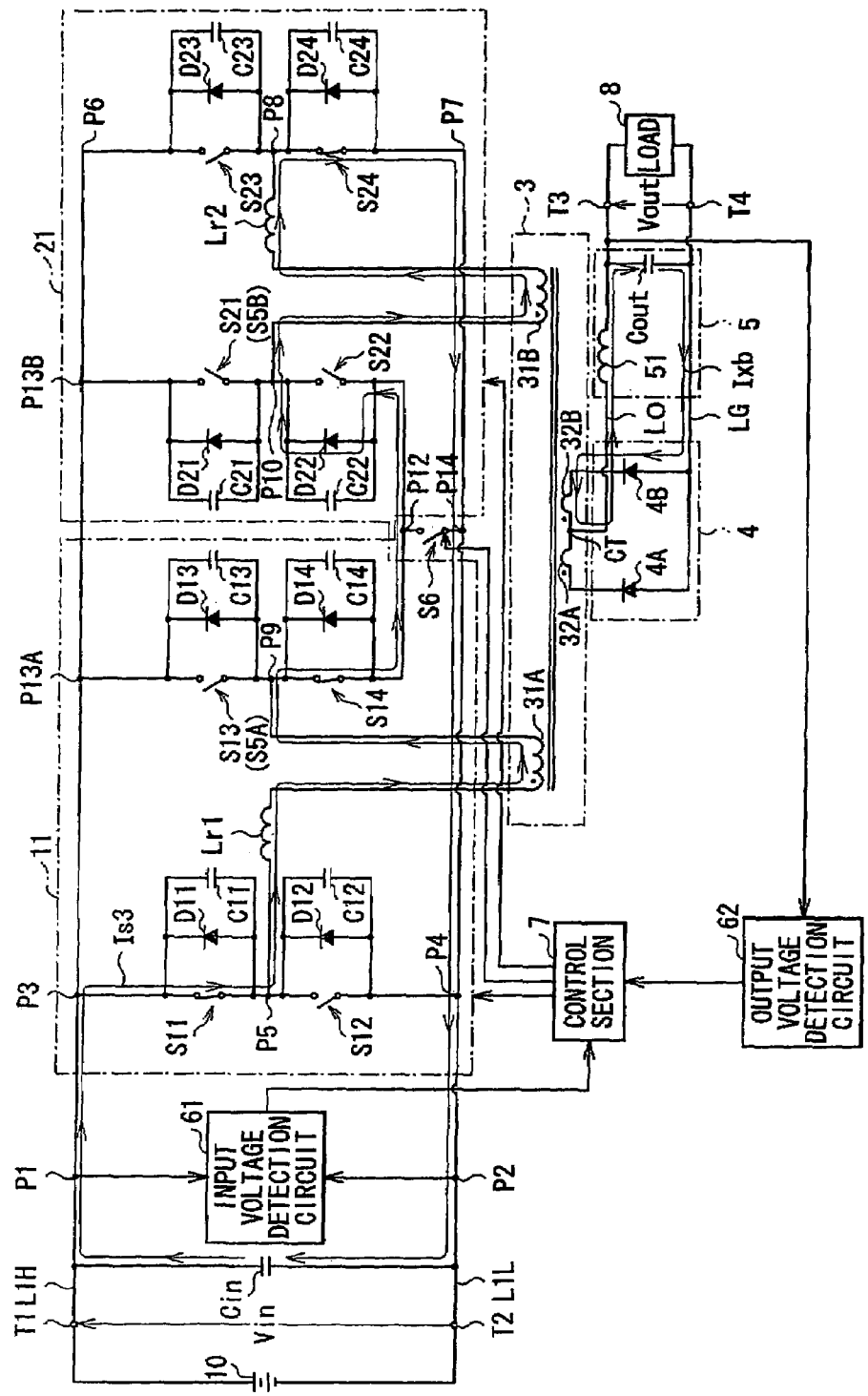
FIG. 17 is a circuit diagram for explaining operation in the series connection condition of the switching power supply unit of FIG. 14.
Figure 18:
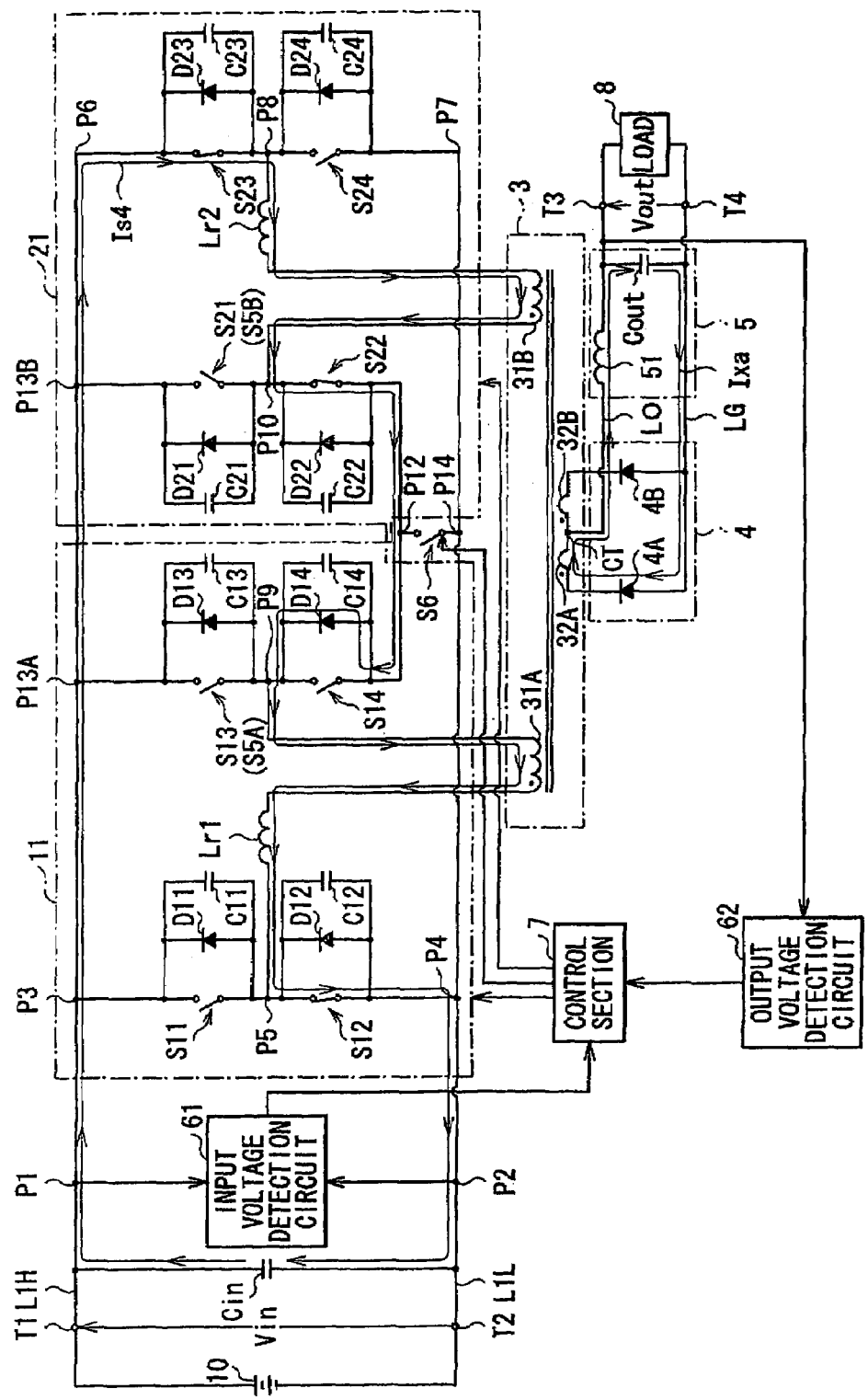
FIG. 18 is a circuit diagram for explaining operation in the series connection condition following FIG. 17.

On the other hand, in a series connection state as shown in FIG. 17 and FIG. 18, while the control section 7 sets the connection changeover switch S6 to be off, connection changeover switches S5A and S5B (switching elements S13 and S21) simply perform on/off operation respectively, and thus the switching circuits 11 and 21 perform series operation coupled with each other as the first embodiment.

More specifically, in the operation condition as shown in FIG. 17, a current path (corresponding to the first current path) passing the input smoothing capacitor $C_{in}$, switching element S11, inductor Lr1, primary winding 31A, and switching element S14, and a current path (corresponding to the second current path) passing the primary winding 31B, inductor Lr2, and switching element S24 are coupled with each other by a current path passing the switching element S14 and the diode D22, so that they are in a series connection state to each other. That is, a current path Is3 is formed, the path passing the input smoothing capacitor $C_{in}$, switching element S11, inductor Lr1, primary winding 31A, switching element S14, diode D22, primary winding 31B, inductor Lr2, and switching element S24.

In an operation condition as shown in FIG. 18, a current path (corresponding to the second current path) passing the input smoothing capacitor $C_{in}$, switching element S23, inductor Lr2, primary winding 31B, and switching element S22, and a current path (corresponding to the first current path) passing the primary winding 31A, inductor Lr1, and switching element S12 are coupled with each other by a current path passing the switching element S22 and the diode D14, so that they are in a series connection state to each other. That is, a current path Is4 is formed, the path passing the input smoothing capacitor $C_{in}$, switching element S23, inductor Lr2, primary winding 31B, switching element S22, diode D14, primary winding 31A, inductor Lr1, and switching element S12.

In the above way, again in the embodiment, the same advantages as in the first embodiment can be obtained by the same effect as in the first embodiment. That is, a turn ratio can be changed depending on a level of the input DC voltage $V_{in}$, and tolerance for shift in timing between the switching circuits 11 and 21 can be increased, consequently an input voltage range can be widened while suppressing production of the surge current.

Moreover, in the embodiment, since the switching elements S13 and S21 in the switching circuits 11 and 21 further operate as the connection changeover switches (connection changeover switches S5A and S5B), the number of switching elements can be decreased by one compared with the first embodiment, consequently component price can be further reduced, and size of the unit as a whole can be reduced.

While, in a case described above, the connection changeover switch S5 is alternatively replaced with the switching elements in the switching circuits, the connection changeover switch S6 may be alternatively replaced with the switching elements in the switching circuits. In the case of such a configuration, the same advantages as in the embodiment can be obtained as well.

Third Embodiment

Next, a third embodiment of the invention is described.

Figure 19:
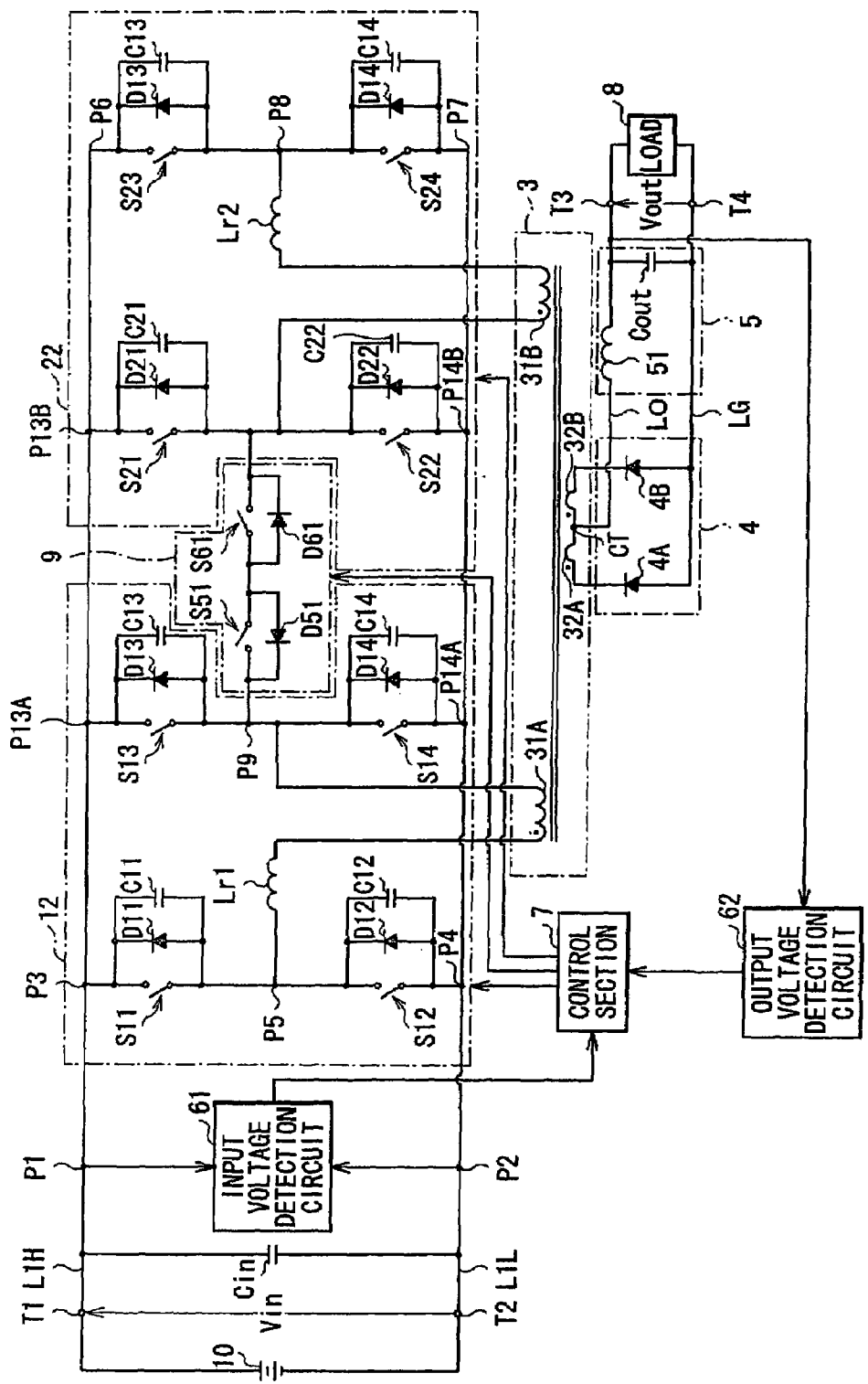
FIG. 19 is a circuit diagram showing a configuration of a switching power supply unit according to a third embodiment of the invention.

FIG. 19 shows a configuration of a switching power supply unit according to the embodiment. In the figure, the same components as components shown in FIG. 1 and FIG. 14 are marked with the same references, and appropriately omitted to be described. In the switching power supply unit, a bidirectional switch section 9 including connection changeover switches S51 and S61 are provided between two switching circuits 12 and 22 being in a full-bridge type.

The bidirectional switch section 9 is provided between a common connection point (connection point P9) connecting each one of ends of the switching elements S13 and S14 in the switching circuit 12, and a common connection point (connection point P10) connecting each one of ends of the switching elements S21 and S22 in the switching circuit 22, and has two connection changeover switches S51 and S61 connected in series in a direction opposite to each other, and diodes D51 and D61 connected in parallel to the connection changeover switches S51 and S61 respectively. The diodes D51 and D61 are also connected in an opposite direction, and a cathode of the diode D51 is connected to the connection point P9, a cathode of the diode D61 is connected to the connection point P10, and anodes of the diodes D51 and D61 are commonly connected to a pair of ends of the connection changeover switches S51 and S61 respectively. According to such a configuration, the bidirectional switch section 9 can flow a current in either direction, and can interrupt current in either direction. The changeover switches S51 and S61 are also configured by switch elements such as MOS-FET or IGBT, and the diodes D51 and D61 may be configured by parasitic diodes of the switch elements.

Here, the bidirectional switch section 9 corresponds to one specific example of the "bidirectional switch" of an embodiment of the invention.

According to such a configuration, in the switching power supply unit of the embodiment, the control section 7 performs connection changeover control between the parallel connection state and the series connection state in the following way.

Figure 20:
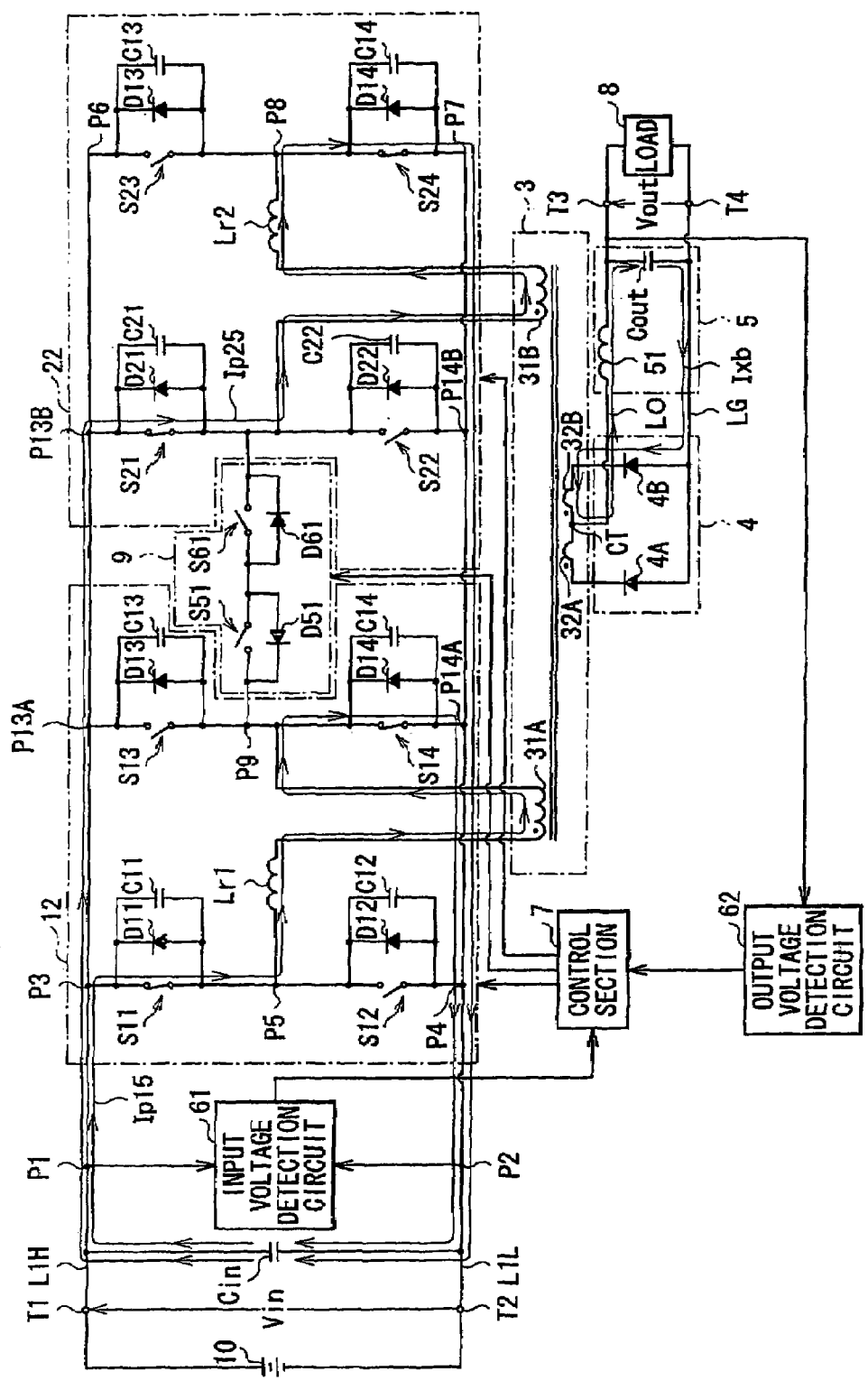
FIG. 20 is a circuit diagram for explaining operation in the parallel connection condition of the switching power supply unit of FIG. 19.
Figure 21:
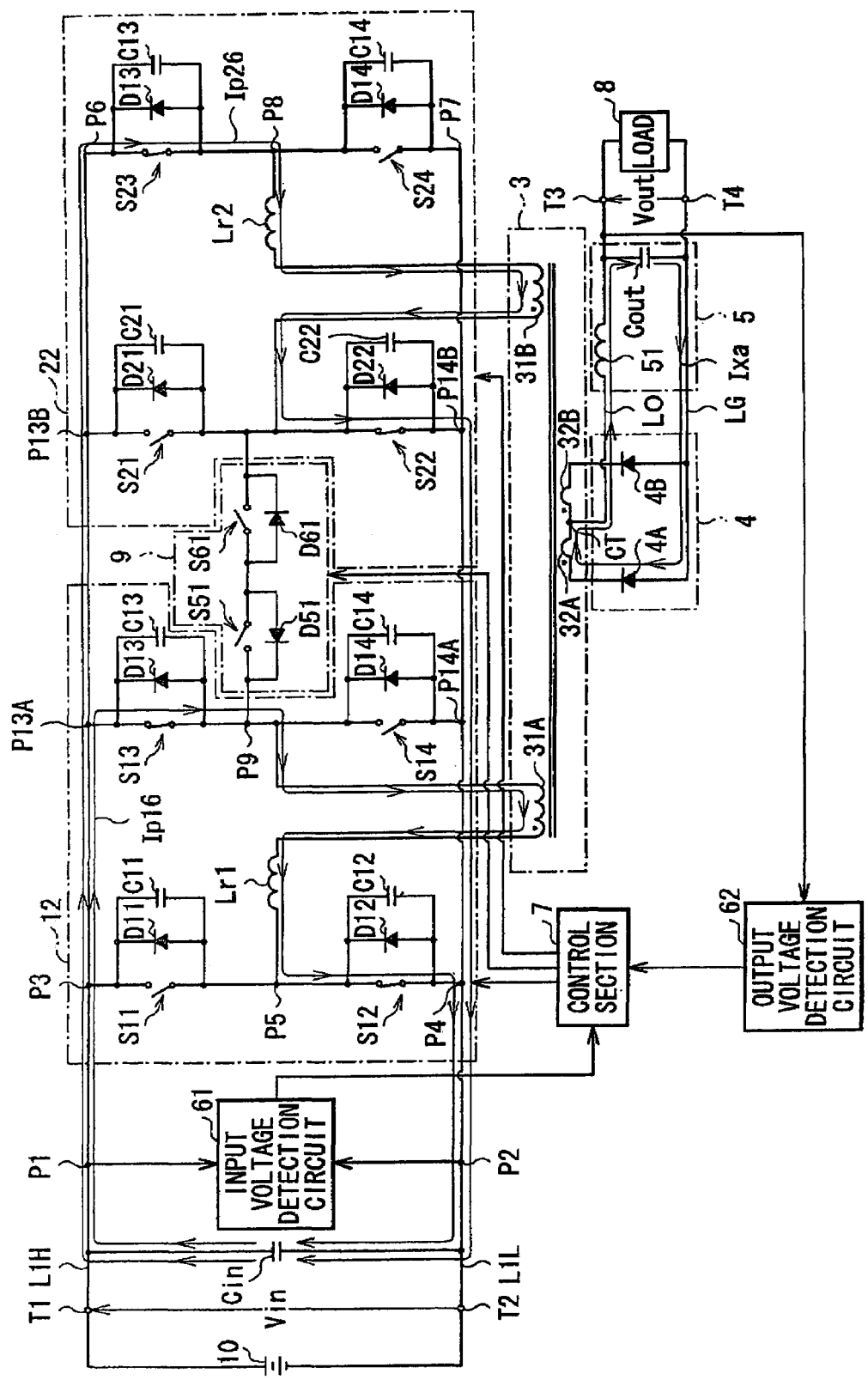
FIG. 21 is a circuit diagram for explaining operation in the parallel connection condition following FIG. 20.

That is, in a parallel connection state as shown in FIG. 20 and FIG. 21, the control section 7 sets the connection changeover switches S51 and S61 to be off respectively, and thus the switching circuits 12 and 22 perform parallel operation independent of each other as the first and second embodiments.

Specifically, in an operation condition as shown in FIG. 20, a current path Ip15 (corresponding to the first current path) passing the input smoothing capacitor $C_{in}$, switching element S11, inductor Lr1, primary winding 31A, and switching element S14, and a current path Ip25 (corresponding to the second current path) passing the input smoothing capacitor $C_{in}$, switching element S21, primary winding 31B, inductor Lr2, and switching element S24 are in the parallel connection state to each other.

In an operation condition as shown in FIG. 21, a current path Ip16 (corresponding to the first current path) passing the input smoothing capacitor $C_{in}$, switching element S13, primary winding 31A, inductor Lr1, and switching element S12, and a current path Ip26 (corresponding to the second current path) passing the input smoothing capacitor $C_{in}$, switching element S23, inductor Lr2, primary winding 31B, and switching element S22 are in the parallel connection state to each other.

Figure 22:
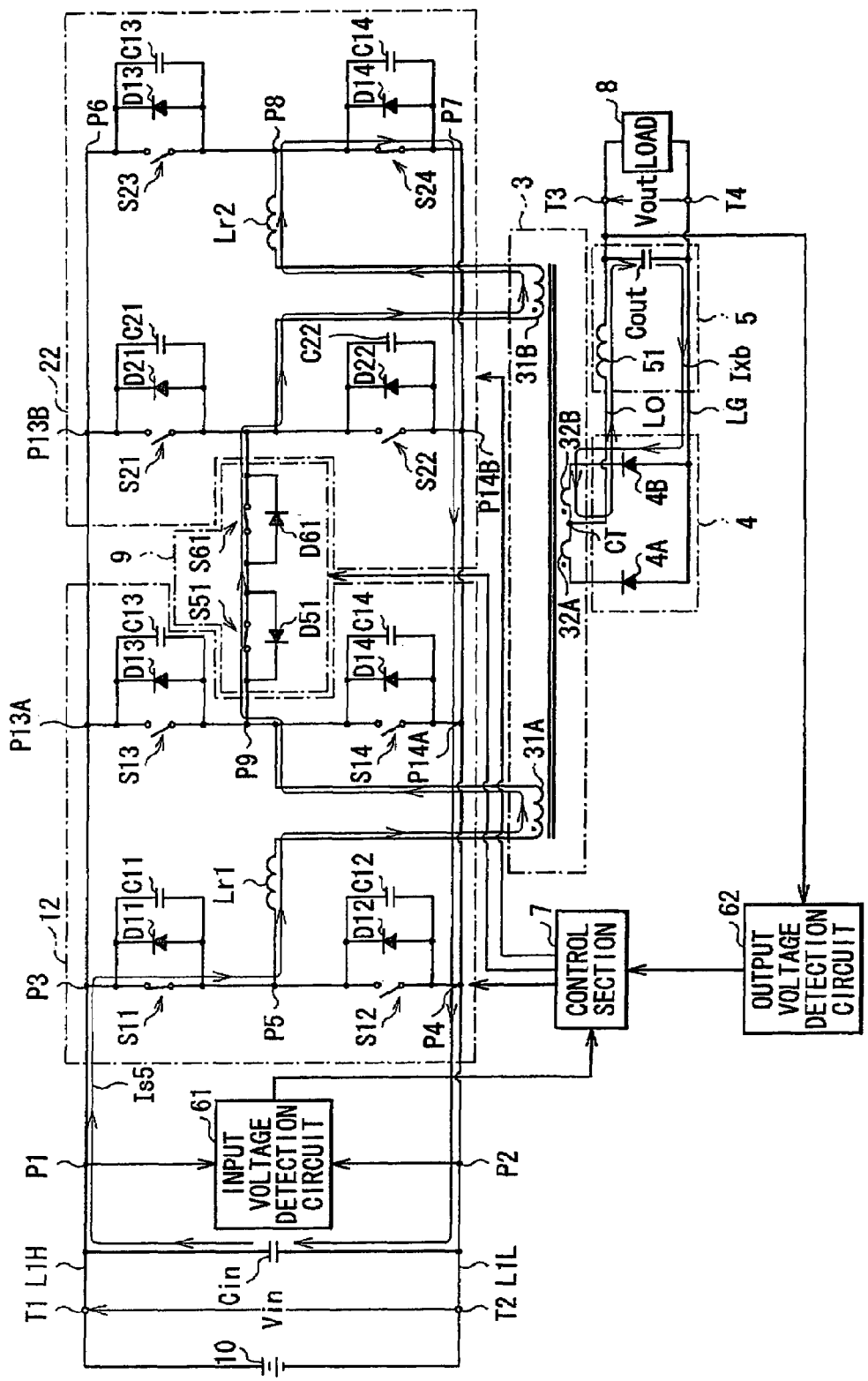
FIG. 22 is a circuit diagram for explaining operation in the series connection condition of the switching power supply unit of FIG. 19.
Figure 23:
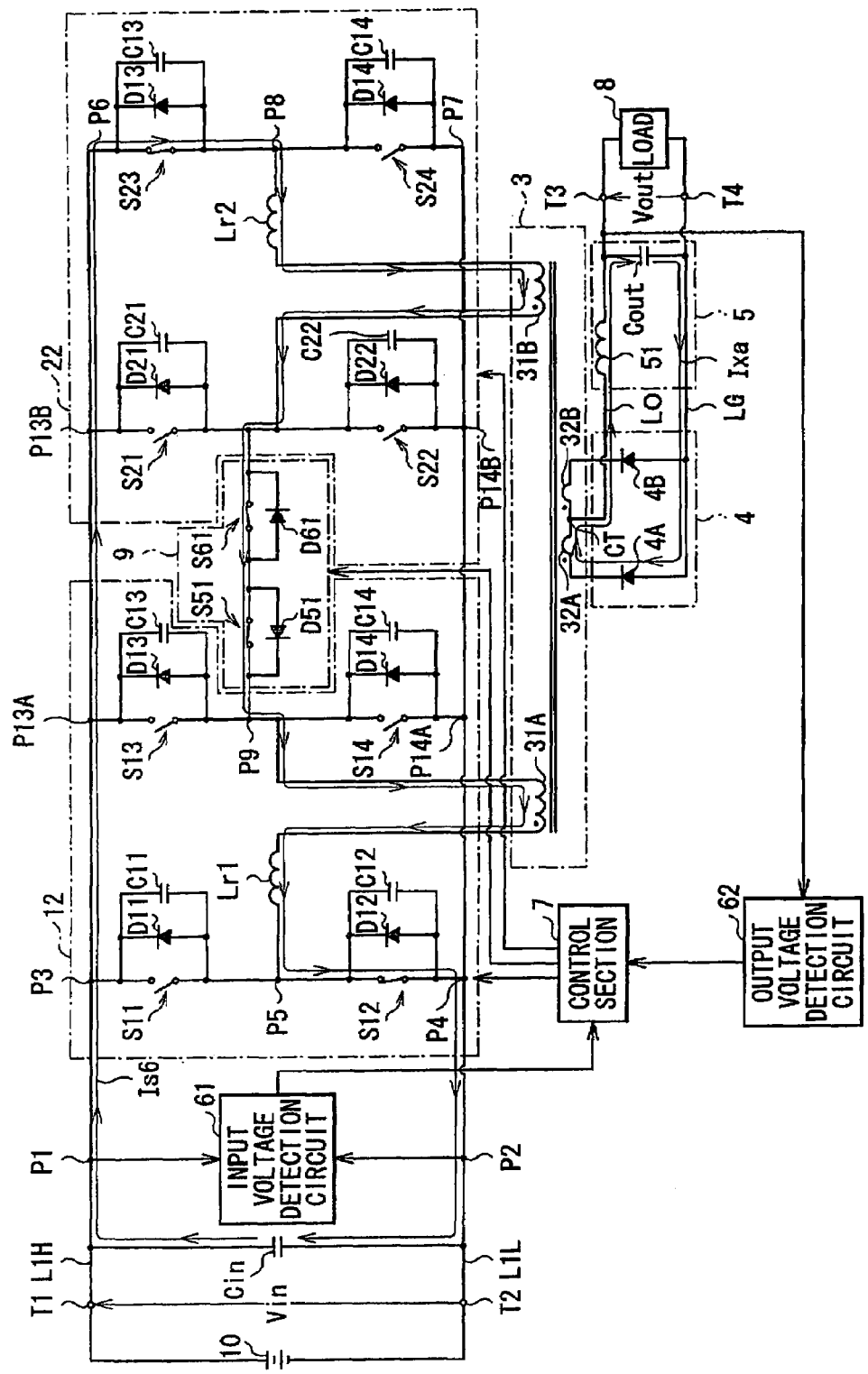
FIG. 23 is a circuit diagram for explaining operation in the series connection condition following FIG. 22.
Figure 24:
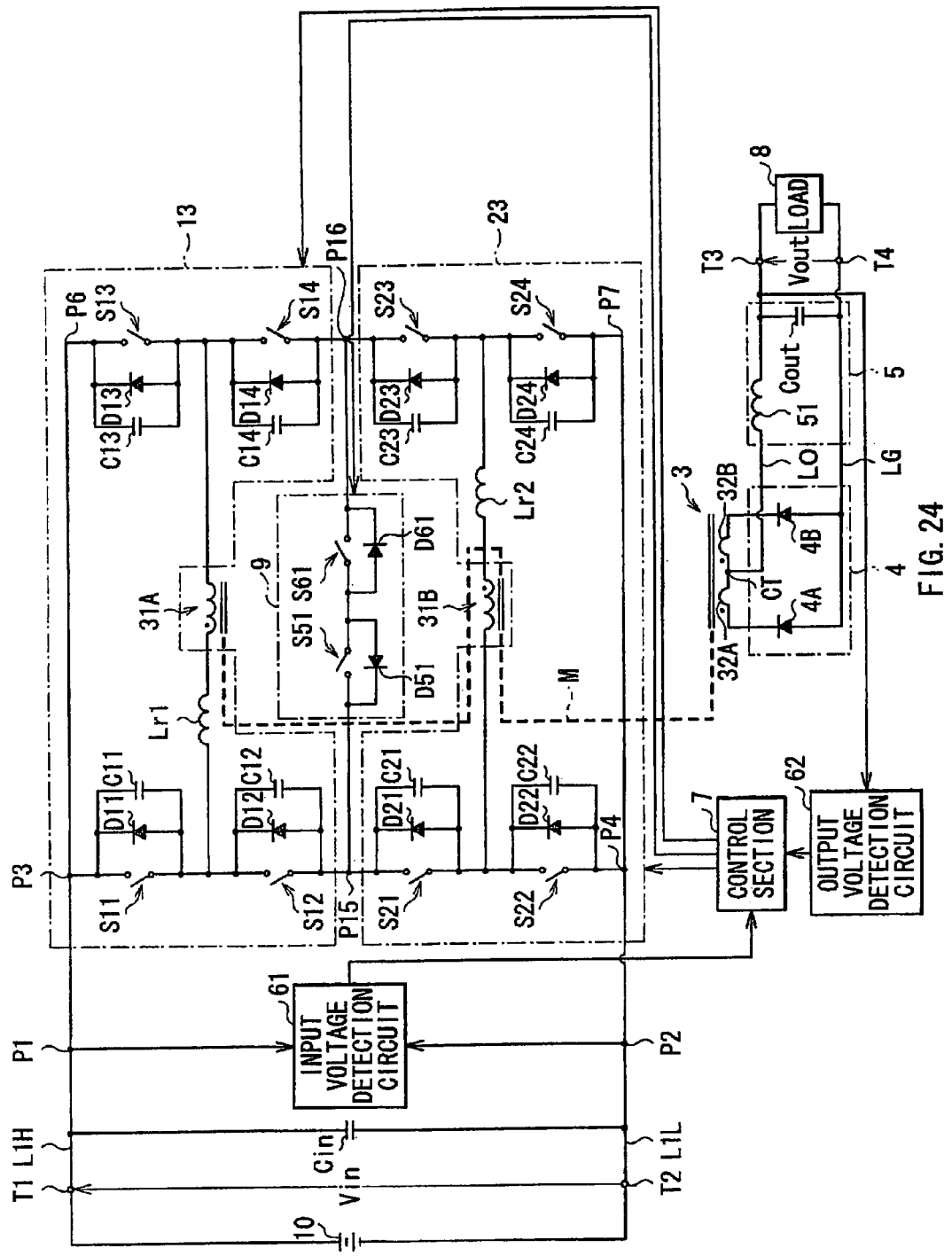
FIG. 24 is a circuit diagram showing a configuration of a switching power supply unit according to a fourth embodiment of the invention.

On the other hand, in the series connection state as shown in FIG. 22 and FIG. 23, the control section 7 sets the connection changeover switches S51 and S61 to be on respectively, and thus the switching circuits 12 and 22 perform series operation coupled with each other as the first and second embodiments.

Specifically, in an operation condition as shown in FIG. 22, a current path (corresponding to the first current path) passing the input smoothing capacitor $C_{in}$, switching element S11, inductor Lr1, and primary winding 31A, and a current path (corresponding to the second current path) passing the primary winding 31B, inductor Lr2, and switching element S24 are coupled with each other by the bidirectional switch section 9, so that they are in the series connection state to each other. That is, a current path Is5 is formed, the path passing the input smoothing capacitor $C_{in}$, switching element S11, inductor Lr1, primary winding 31A, connection changeover switch S51, connection changeover switch S61, primary winding 31B, inductor Lr2, and switching element S24.

In an operation condition as shown in FIG. 23, a current path (corresponding to the second current path) passing the input smoothing capacitor $C_{in}$, switching element S23, inductor Lr2, and primary winding 31B, and a current path (corresponding to the first current path) passing the primary winding 31A, inductor Lr1, and switching element S12 are coupled with each other by the bidirectional switch section 9, so that they are in the series connection state to each other. That is, a current path Is6 is formed, the path passing the input smoothing capacitor $C_{in}$, switching element S23, inductor Lr2, primary winding 31B, connection changeover switch S61, connection changeover switch S51, primary winding 31A, inductor Lr1, and switching element S12.

In the above way, again in the embodiment, the same advantages as in the first and second embodiments can be obtained by the same effects as in the embodiments. That is, a turn ratio can be changed depending on a level of the input DC voltage $V_{in}$, and tolerance for shift in timing between the switching circuits 12 and 22 can be increased, consequently an input voltage range can be widened while suppressing production of the surge current.

Fourth Embodiment

Next, a fourth embodiment of the invention is described.

Figure 25:
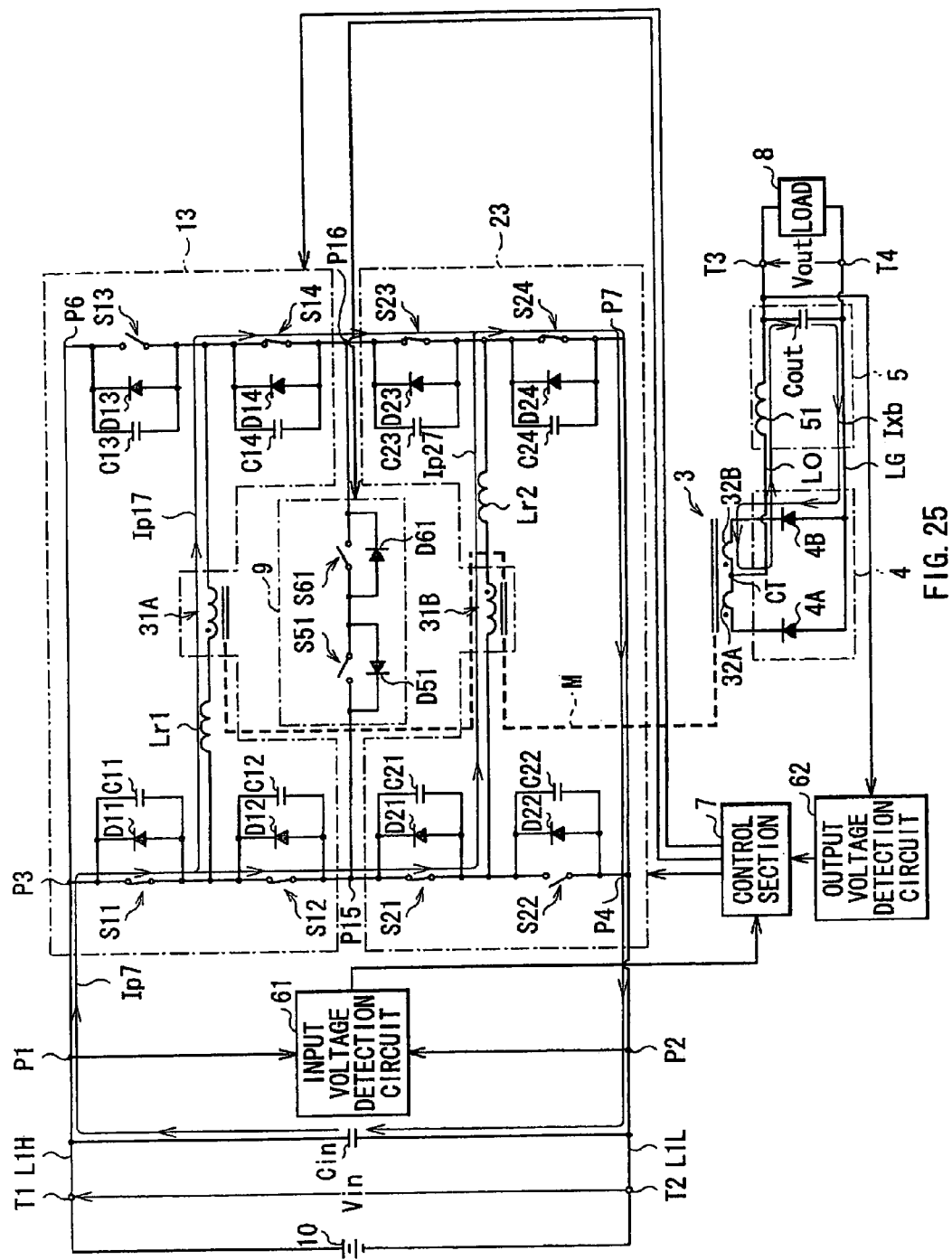
FIG. 25 is a circuit diagram for explaining operation in the parallel connection condition of the switching power supply unit of FIG. 24.

FIG. 25 shows a configuration of a switching power supply unit according to the embodiment. In the figure, the same components as components shown in FIGS. 1, 14 and 19 are marked with the same references, and appropriately omitted to be described. In the switching power supply unit, two switching circuits 13 and 23 of the full-bridge type are vertically stacked between the primary high-voltage line L1H and the primary low-voltage line L1L, and the bidirectional switch section 9 is provided between the switching circuits 13 and 23.

Specifically, an arm at a side where the switching elements S11 and S12 are disposed in the switching circuit 13, and an arm at a side where the switching elements S21 and S22 are disposed in the switching circuit 23 are commonly connected to each other at a connection point P15. Moreover, an arm at a side where the switching elements S13 and S14 are disposed in the switching circuit 13, and an arm at a side where the switching elements S23 and S24 are disposed in the switching circuit 23 are commonly connected to each other at a connection point P16. The bidirectional switch section 9 is provided between the connection points P15 and P16. Here, the connection points P15 and P16 correspond to one specific example of the "third common connection point" and the "fourth common connection point" respectively.

The primary windings 31A and 31B of the transformer 3 are magnetically coupled with each other as shown by a mark M.

According to such a configuration, in the switching power supply unit of the embodiment, the control section 7 performs connection changeover control between the parallel connection state and the series connection state in the following way.

Figure 26:
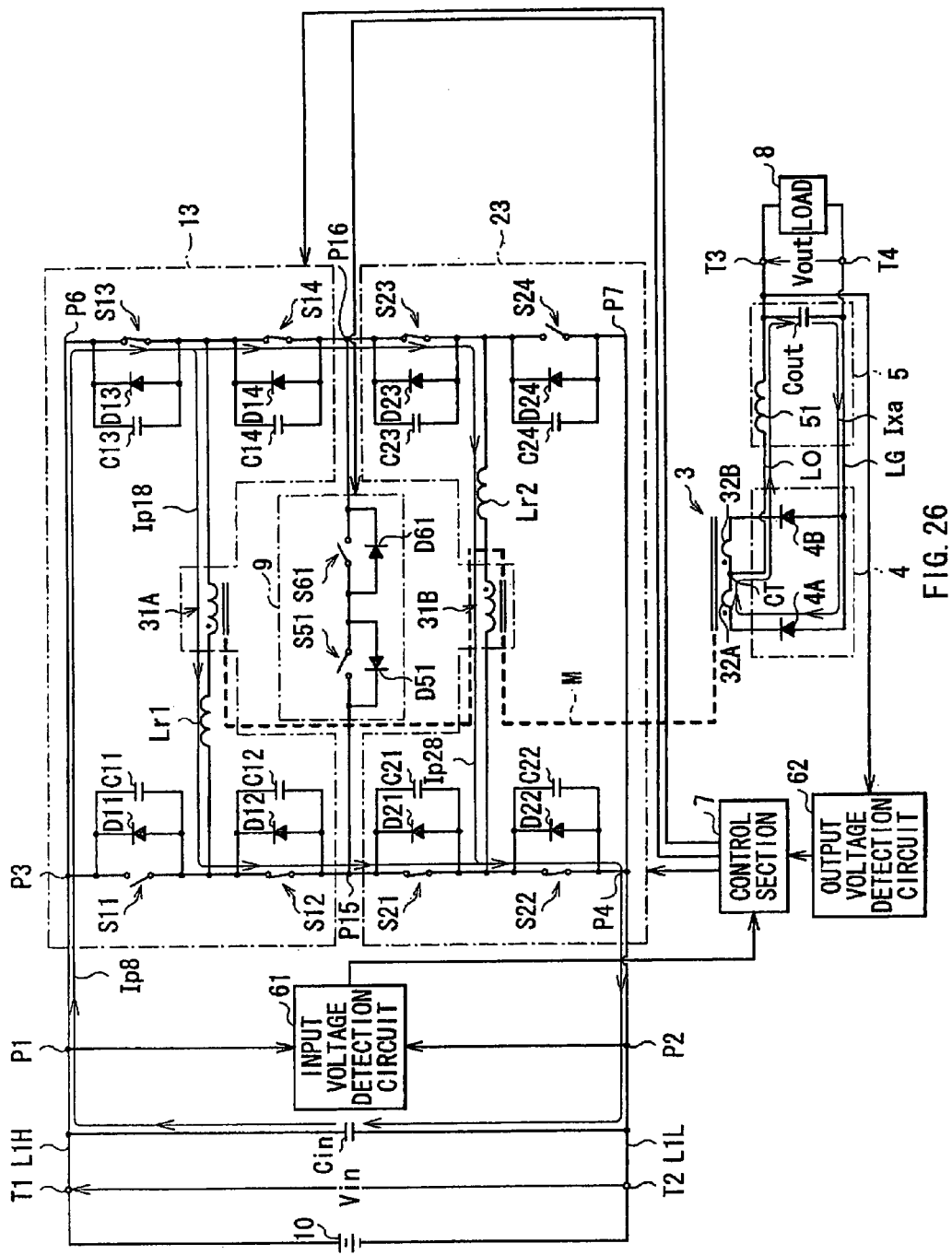
FIG. 26 is a circuit diagram for explaining operation in the parallel connection condition following FIG. 25.

That is, in a parallel connection state as shown in FIG. 25 and FIG. 26, the control section 7 sets the connection changeover switches S51 and S61 to be off respectively, and thus the switching circuits 13 and 23 perform parallel operation independent of each other as the first to third embodiments.

Specifically, in an operation condition as shown in FIG. 25, a current path Ip17 (corresponding to the first current path) passing the input smoothing capacitor $C_{in}$, switching element S11, inductor Lr1, primary winding 31A, switching element S14, switching element S23, and switching element S24, and a current path Ip27 (corresponding to the second current path) passing the input smoothing capacitor $C_{in}$, switching element S11, switching element S12, switching element S21, primary winding 31B, inductor Lr2, and switching element S24 are in the parallel connection state to each other.

In an operation condition as shown in FIG. 26, a current path Ip18 (corresponding to the first current path) passing the input smoothing capacitor $C_{in}$, switching element S13, primary winding 31A, inductor Lr1, switching element S12, switching element S21, and switching element S22, and a current path Ip28 (corresponding to the second current path) passing the input smoothing capacitor $C_{in}$, switching element S13, switching element S14, switching element S23, inductor Lr2, primary winding 31B, and switching element S22 are in the parallel connection state to each other.

Figure 27:
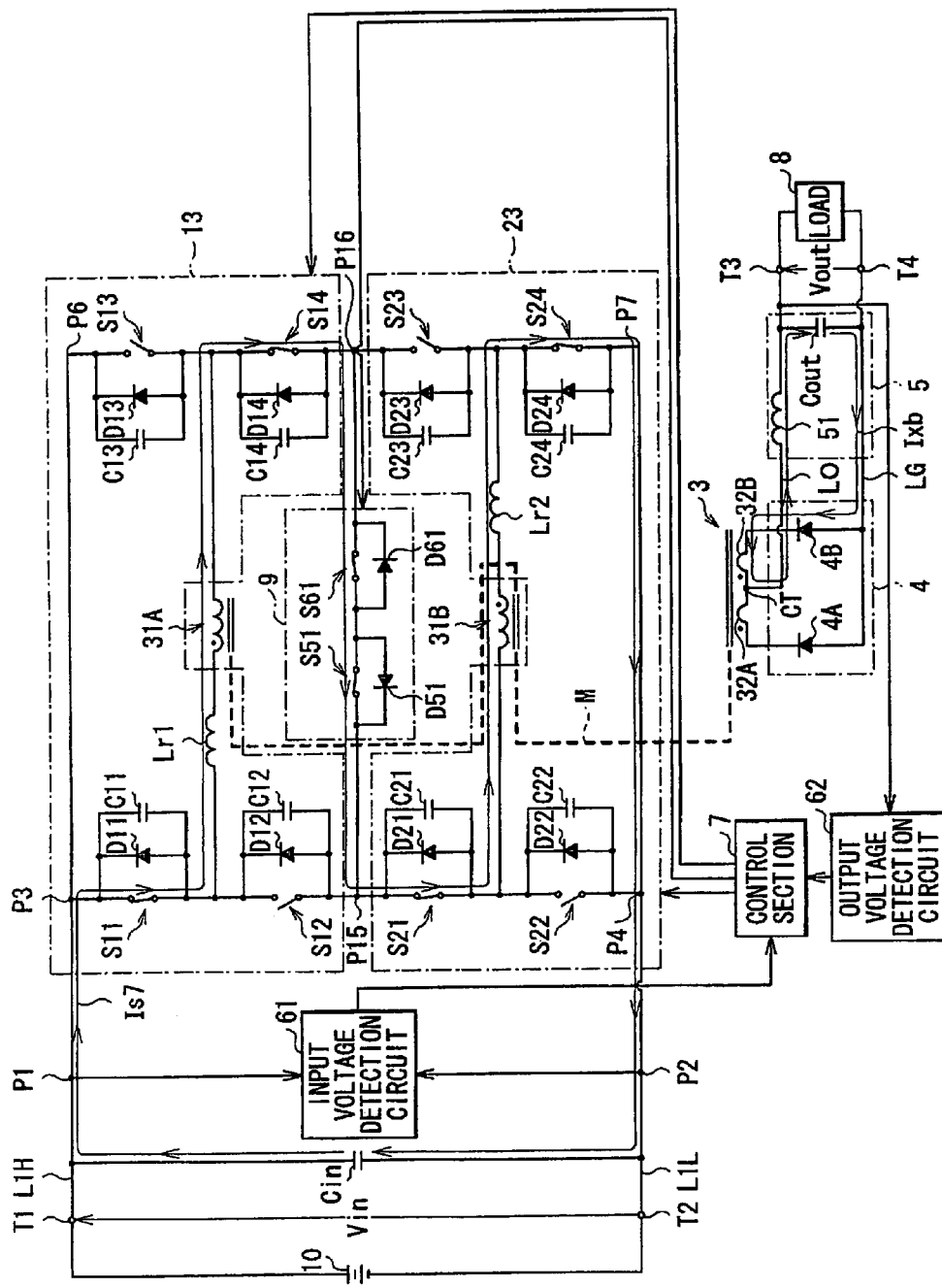
FIG. 27 is a circuit diagram for explaining operation in the series connection condition of the switching power supply unit of FIG. 24.
Figure 28:
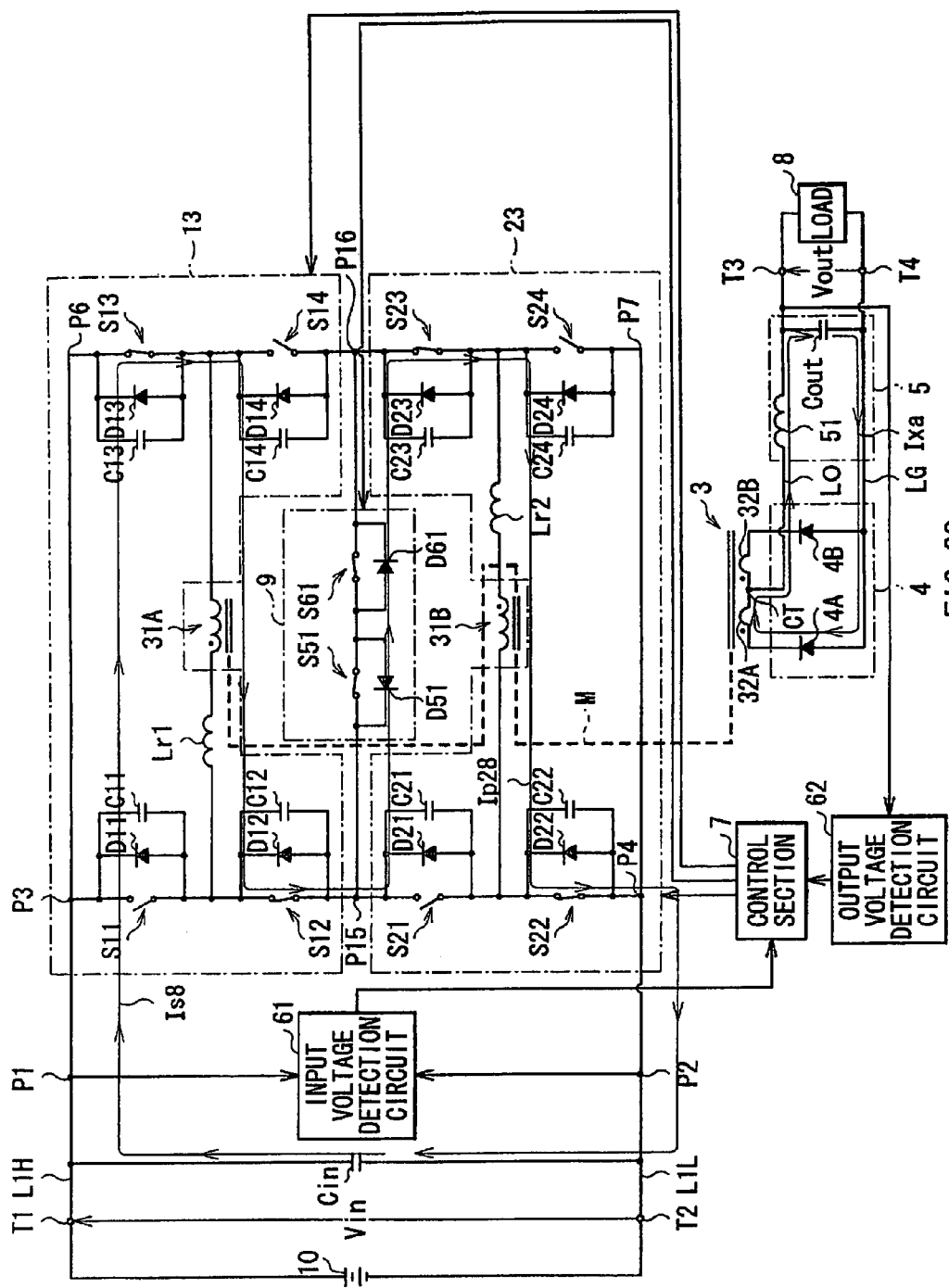
FIG. 28 is a circuit diagram for explaining operation in the series connection condition following FIG. 27.

On the other hand, in a series connection state as shown in FIG. 27 and FIG. 28, the control section 7 sets the connection changeover switches S51 and S61 to be on respectively, and thus the switching circuits 13 and 23 perform series operation coupled with each other as the first to third embodiments.

Specifically, in the operation condition as shown in FIG. 27, a current path (corresponding to the first current path) passing the input smoothing capacitor $C_{in}$, switching element S11, inductor Lr1, primary winding 31A, and switching element S14, and a current path (corresponding to the second current path) passing the switching element S21, primary winding 31B, inductor Lr2, and switching element S24 are coupled with each other by the bidirectional switch section 9, so that they are in the series connection state to each other. That is, a current path Is7 is formed, the path passing the input smoothing capacitor $C_{in}$, switching element S11, inductor Lr1, primary winding 31A, connection changeover switch S61, connection changeover switch S51, switching element S21, primary winding 31B, inductor Lr2, and switching element S24.

In an operation condition as shown in FIG. 28, a current path (corresponding to the first current path) passing the input smoothing capacitor $C_{in}$, switching element S13, primary winding 31A, inductor Lr1, and switching element S12, and a current path (corresponding to the second current path) passing the switching element S23, inductor Lr2, primary winding 31B, and switching element S22 are coupled with each other by the bidirectional switch section 9, so that they are in the series connection state to each other. That is, a current path Is8 is formed, the path passing the input smoothing capacitor $C_{in}$, switching element S13, primary winding 31A, inductor Lr1, connection changeover switch S51, connection changeover switch S61, switching element S23, inductor Lr2, primary winding 31B, and switching element S22.

In the above way, again in the embodiment, the same advantages as in the first to third embodiments can be obtained by the same effects as in the embodiments. That is, a turn ratio can be changed depending on a level of the input DC voltage $V_{in}$, and tolerance for shift in timing between the switching circuits 13 and 23 can be increased, consequently an input voltage range can be widened while suppressing production of the surge current.

Fifth Embodiment

Next, fifth embodiment of the invention is described. A switching power supply unit of the embodiment has a control section 70 in place of the control section 7 in the switching power supply unit of the first embodiment.

Figure 29:
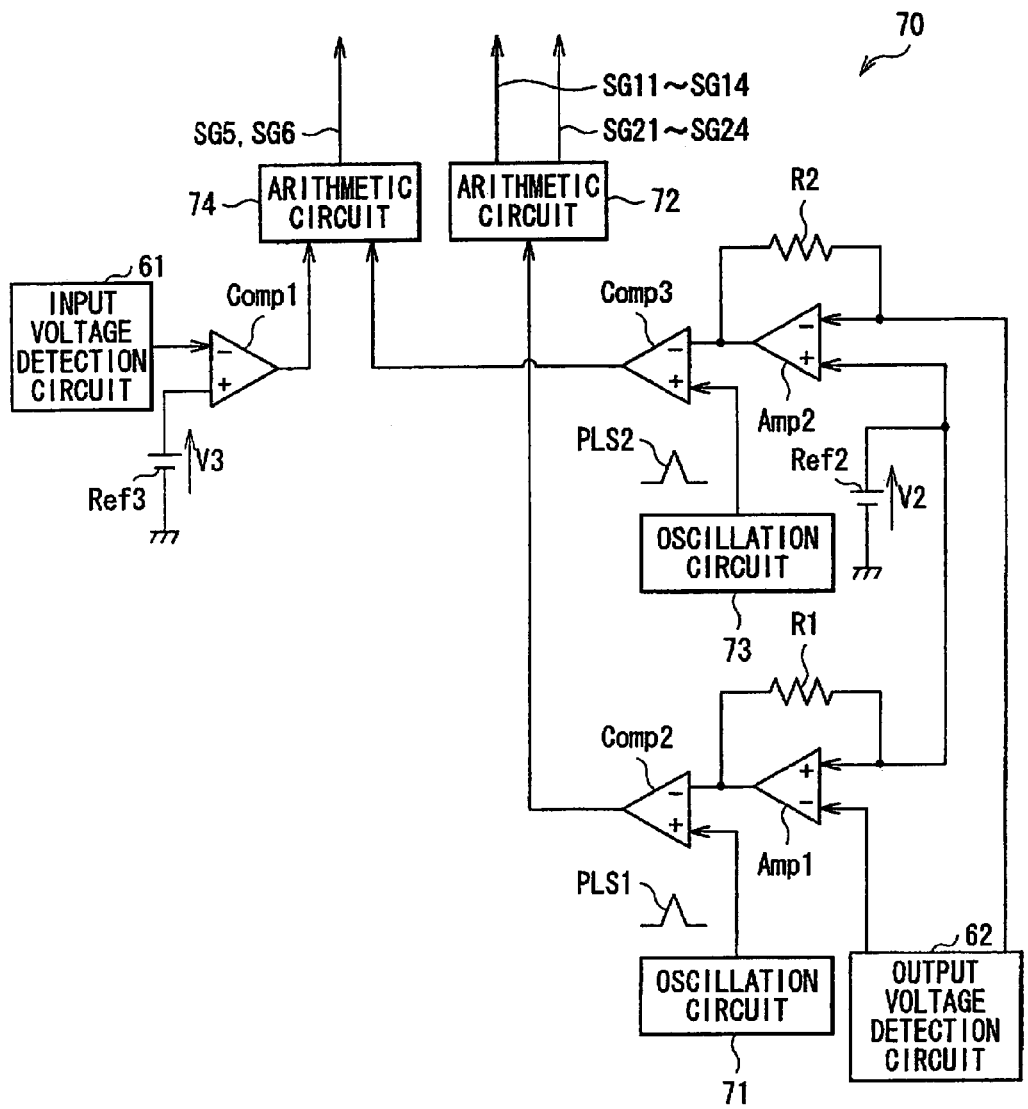
FIG. 29 is a circuit diagram showing a configuration of a control section of a switching power supply unit according to a fifth embodiment of the invention.

FIG. 29 shows a configuration of the control section 70 according to the embodiment. In the figure, the same components as components shown in FIG. 2 are marked with the same references, and appropriately omitted to be described. In the control section 70, a reference power supply Ref3, an oscillation circuit 73, a differential amplifier Amp2, a resistor R2, a comparator Comp3, and an arithmetic circuit 74 are additionally provided in the control section 7 in the first embodiment.

The plus input terminal of the comparator Comp1 is connected to one end of the reference power supply Ref3 instead of the reference power supply Ref1. A plus input terminal of the differential amplifier Amp2 is connected to one end of the reference power supply Ref2, a minus input terminal is connected to an output terminal of the output voltage detection circuit 62, and an output terminal is connected to the anode input terminal of the comparator Comp2. However, a voltage to be supplied to the minus input terminal of the differential amplifier Amp2 is set slightly high compared with a voltage to be supplied to the minus input terminal of the differential amplifier Amp1, for example, due to difference in drawing position of a voltage from the voltage-dividing resistance in the output voltage detection circuit 62. A plus input terminal of the comparator Comp3 is connected to an output terminal of the oscillator 73, and an output terminal is connected to an input terminal of the arithmetic circuit 74. Two input terminals of the arithmetic circuit 74 are connected to the output terminal of the comparator Comp3 and the output terminal of the comparator Comp1. The resistor R2 is disposed between the minus input terminal and the output terminal of the differential amplifier Amp2.

The comparator Comp1 of the embodiment compares reference potential V3 from the reference power supply Ref3 corresponding to potential of a voltage $V_{thH}$ or voltage $V_{thL}$ described later, with potential of a voltage corresponding to the input DC voltage $V_{in}$ outputted from the input voltage detection circuit 61, and outputs a result of the comparison to the arithmetic circuit 74. Specifically, when the input DC voltage $V_{in}$ is higher than the voltage $V_{thH}$, the drive signals SG5 and SG6 are in the "L" level, and on the other hand, when the input DC voltage $V_{in}$ is conversely lower than the voltage $V_{thH}$, the drive signals SG5 and SG6 are in the "H" level.

The differential amplifier Amp2 amplifies potential difference between the reference potential V2 from the reference power supply Ref2, and potential of the voltage corresponding to the output DC voltage $V_{out}$ outputted from the output voltage detection circuit 62, and outputs the amplified potential difference.

The comparator Comp3 compares potential of a pulse voltage PLS3 outputted from the oscillation circuit 73 with potential of an output voltage from the differential amplifier Amp2, and outputs a pulse voltage as an origin of the drive signals SG5 and SG6 for the connection changeover switches S5 and S6 based on a result of the comparison. Specifically, when the output voltage from the differential amplifier Amp2 is higher than the pulse voltage PLS2, output of the comparator is in the "L" level, and on the other hand, when the output voltage from the differential amplifier Amp2 is conversely lower than the pulse voltage PLS2, the input DC output of the comparator is in the "H" level.

The arithmetic circuit 74 performs logic operation based on an output signal ("H" or "L") from the comparator Comp1 and an output signal (pulse voltage signal) from the comparator Comp3, and outputs the drive signals SG5 and SG6 for the connection changeover switches S5 and S6.

According to such a configuration, as the control section 7, the control section 70 produces the drive signals SG11 to SG14 and SG21 to SG24 based on the voltage corresponding to the output DC voltage $V_{out}$ outputted from the output voltage detection circuit 62, and performs on/off control of the switching elements S11 to S14 and S21 to S24 by using the signals, so that the output DC voltage $V_{out}$ is stabilized (kept constant).

Moreover, the control section 70 produces the drive signals SG5 and SG6 based on a level of a voltage corresponding to the input DC voltage $V_{in}$ outputted from the input voltage detection circuit 61, and a level of a voltage corresponding to the output DC voltage $V_{out}$ outputted from the output voltage detection circuit 62, and controls operation of the connection changeover switches S5 and S6 by using the signals, so that a connection condition between a current path (first current path) passing the switching circuit 1 and the primary winding 31A, and a current path (second current path) passing the switching circuit 2 and the primary winding 31B is changed. Specifically, a relative period of a series connection state where the first current path and the second current path are connected in series to each other, and a relative period of a parallel connection state where the first and second current paths are connected in parallel to each other are changed respectively, thereby the turn ratio (np/ns) between the number of turns np of the primary windings 31A and 31B and the number of turns ns of the secondary windings 32A and 32B is continuously changed (increased or decreased).

Figure 30:
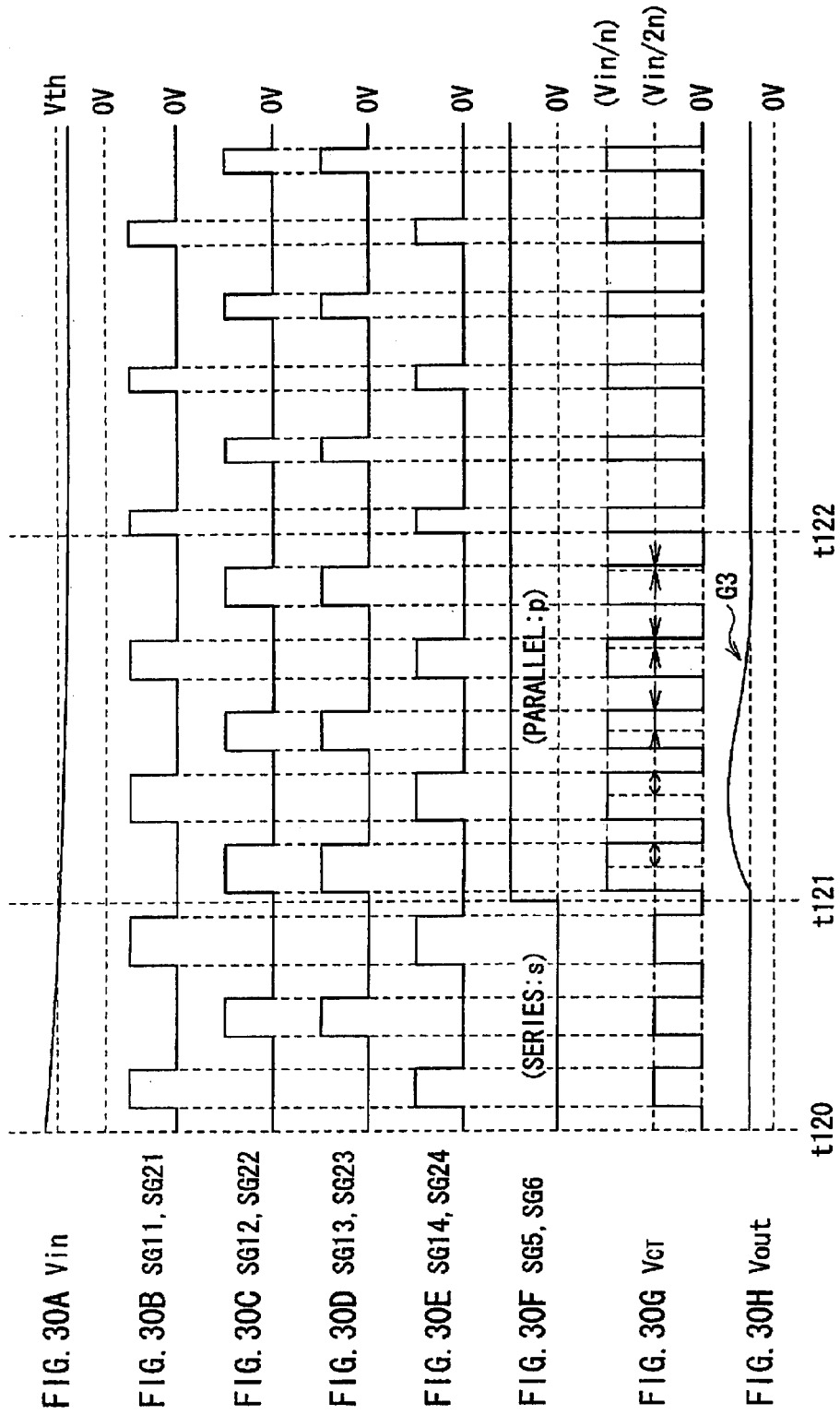
FIG. 30 is a timing waveform view for explaining connection changeover operation by the control section of FIG. 2.
Figure 31:
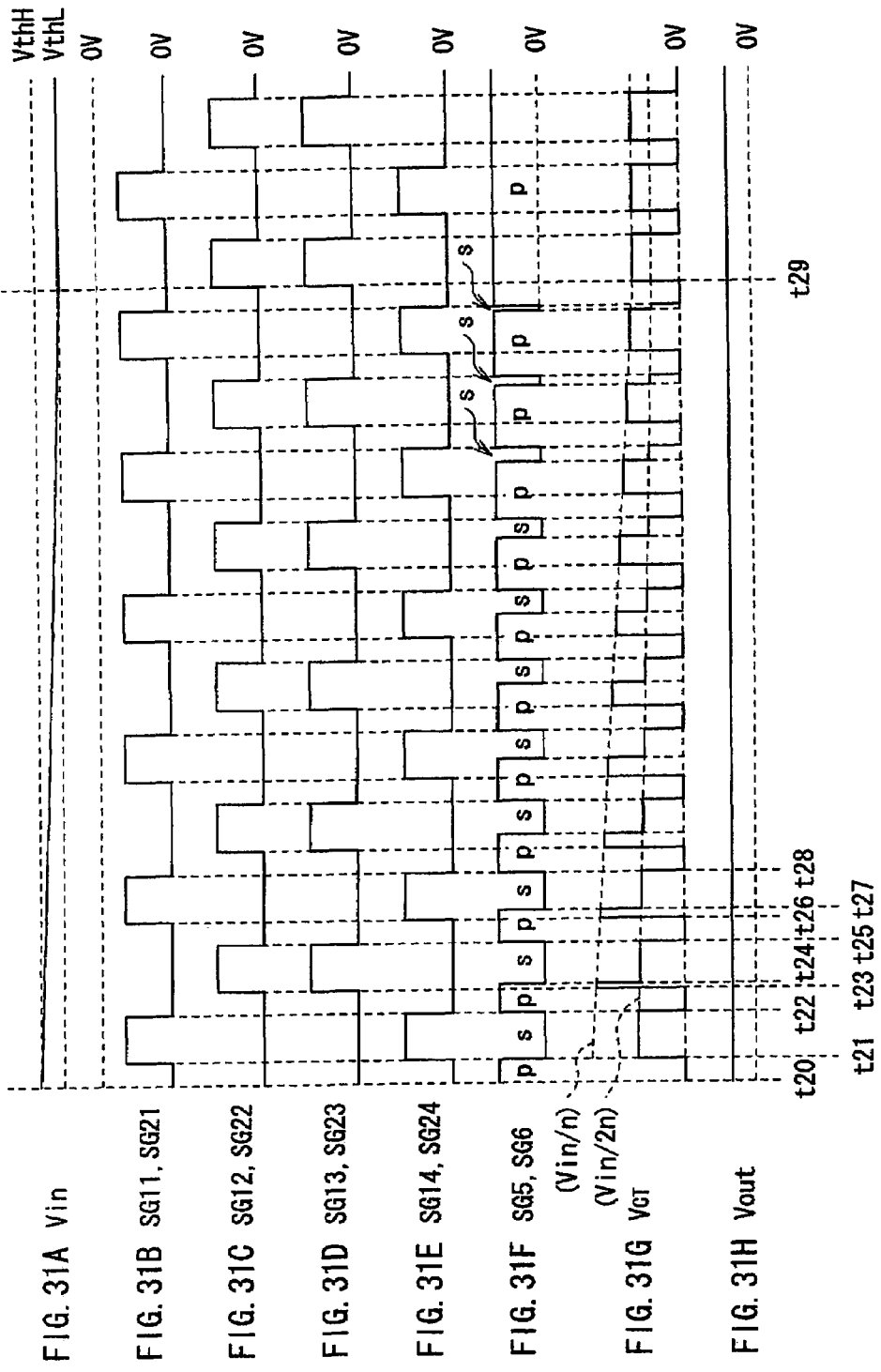
FIG. 31 is a timing waveform view for explaining connection changeover operation by the control section of FIG. 29.
Figure 32:
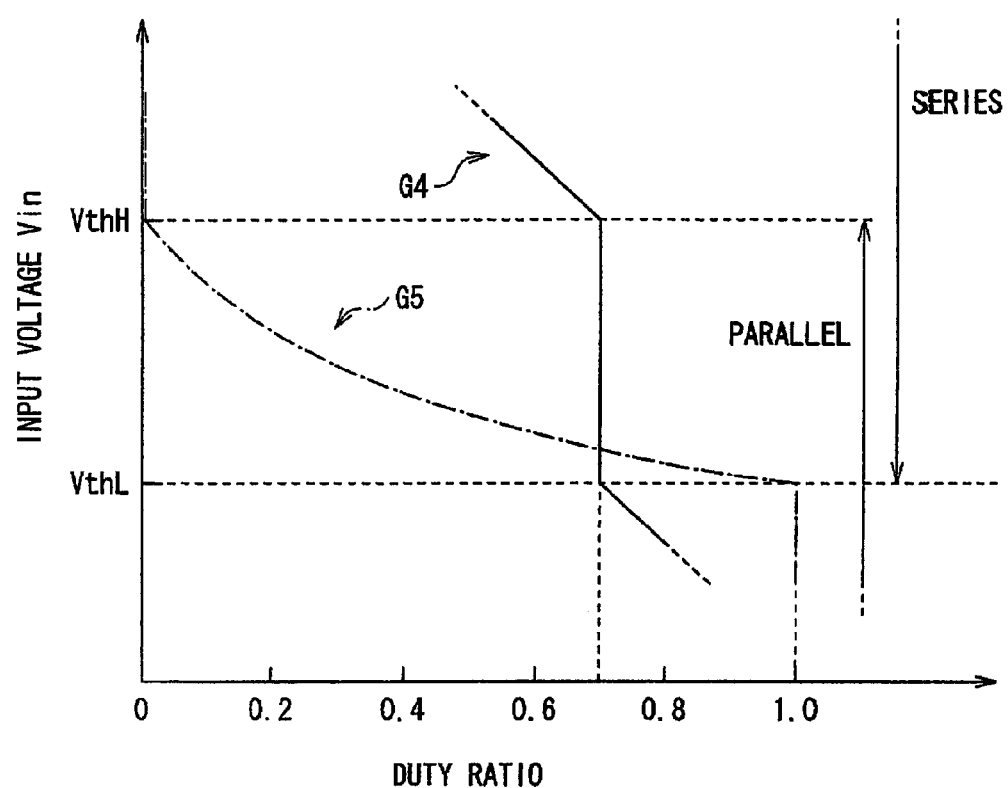
FIG. 32 is a characteristic view showing a relationship between an input voltage, a duty ratio, and a connection condition in the control section of FIG. 29.

Next, description is made on connection changeover control when the input DC voltage $V_{in}$ is changed in the switching power supply unit of the embodiment (having the control section 70 shown in FIG. 29), and in the switching power supply unit of the first embodiment (comparative example, having the control section 7 shown in FIG. 2) with reference to FIGS. 30 to 32, while comparing both cases with each other.

Here, FIG. 30 shows timing waveforms in connection changeover control according to the comparative example, showing timing waveforms between a timing when the input DC voltage $V_{in}$ is higher than the threshold voltage $V_{th}$ and a timing when the voltage $V_{in}$ is lower than the voltage $V_{th}$. On the other hand, FIG. 31 shows timing waveforms in connection changeover control according to the embodiment, showing the timing waveforms while the input DC voltage $V_{in}$ is decreased from the voltage $V_{thH}$ to the voltage $V_{thL}$. Specifically, in FIG. 30 and FIG. 31, (A) indicates the input DC voltage $V_{in}$, (B) indicates the drive signals SG11 and SG21, (C) indicates the drive signals SG12 and SG22, (D) indicates the drive signals SG13 and SG23, (E) indicates the drive signals SG14 and SG24, (F) indicates the drive signals SG5 and SG6, (G) indicates electric potential $V_{CT}$ at the center tap CT, and (H) indicates the output DC voltage $V_{out}$, respectively. FIG. 32 shows a relationship between the input voltage, duty ratio, and connection state in the control section 70 of the embodiment, which corresponds to FIG. 7 in the comparative example (first embodiment). In FIG. 30 and FIG. 31, the series connection state is expressed as "s", and the parallel connection state is expressed as "p".

First, in the comparative example as shown in FIG. 30, when the input DC voltage $V_{in}$ (FIG. 30A) is higher than the threshold voltage $V_{th}$ (timing t120 to timing t121), the drive signals SG5 and SG6 for the connection changeover switches S5 and S6 are off ((F)), so that the first current path and the second current path are in the series connection state; and on the other hand, when the input DC voltage $V_{in}$ is conversely lower than the threshold voltage $V_{th}$ (after timing t121), the drive signals SG5 and SG6 are on, so that the first current path and the second current path are in the parallel connection state. That is, the connection changeover switches S5 and S6 are controlled by the control section 7 such that an on/off state of the switches S5 and S6 is changed depending on whether the input DC voltage $V_{in}$ is higher than the predetermined threshold voltage $V_{th}$ or not. The drive signals SG11 to SG14 and SG21 to SG24 for the switching elements S11 to S14 and S21 to S24 ((B) to (E)) are controlled by the control section 7 such that duty ratios of them are changed to prevent change in the output DC voltage $V_{out}$ due to change in the input DC voltage $V_{in}$, so that the output DC voltage $V_{out}$ ((H)) is kept constant.

However, for example, when change from the series connection condition to the parallel connection state occurs at the timing t121, overshoot is induced in the output DC voltage $V_{out}$, and consequently the voltage $V_{out}$ is not kept constant in a period between timing t121 and timing t122, as shown by a sign G3. The reason for this is that since the connection state is abruptly changed at the timing t121, response speed of the differential amplifier Amp1 (error amplifier) in the control section 7 can not follow such state change, consequently the duty ratios of the drive signals SG11 to SG14 and SG21 to SG24 can not change abruptly (at the threshold voltage $V_{th}$ as shown in FIG. 8), as shown by arrows in the center tap voltage $V_{CT}$ ((G)) in the figure. In this way, in the comparative example, since the duty ratios of the drive signals SG11 to SG14 and SG21 to SG24 are slightly increased between the timing t121 and the timing t122, the overshoot is induced in the output DC voltage $V_{out}$.

On the contrary, in the embodiment, when the input DC voltage $V_{in}$ is changed between the voltage $V_{thH}$ and the voltage $V_{thL}$ as shown in FIG. 31, operation of the connection changeover switches S5 and S6 is controlled depending on a level of the output DC voltage $V_{out}$ (that is, indirectly a level of the input DC voltage $V_{in}$), so that relative periods in the series connection state and the parallel connection state are changed respectively (timing t20 to timing t29), thereby the turn ratio (np/ns) of the number of turns np between the primary windings 31A, 31B and the number of turns ns of the secondary windings 32A, 32B of the transformer 3 is continuously changed, as described before. Specifically, in the example shown in FIG. 31, as the input DC voltage $V_{in}$ is decreased, the relative period in the series connection state is gradually decreased (the relative period in the parallel connection state is gradually increased) so that the turn ratio is continuously decreased. Moreover, since a voltage supplied to the minus input terminal of the differential amplifier Amp2 is set to be slightly higher than a voltage supplied to the minus input terminal of the differential amplifier Amp1, the duty ratios of the drive signals SG11 to SG14 and SG21 to SG24 ((B) to (E) of FIG. 31) are constant. Accordingly, since a voltage waveform of the center tap voltage $V_{CT}$ is as shown in (G) of FIG. 31, and an integral value (area) of the waveform is constant at any time, overshoot is not induced in the output DC voltage $V_{out}$ ((H)), and the voltage $V_{out}$ is kept constant at any time.

In this way, in the switching power supply unit of the embodiment, for example, while the duty ratios of the drive signals SG11 to SG14 and SG21 to SG24 are constant in a period while the input DC voltage $V_{in}$ is between the voltage $V_{thH}$ and the voltage $V_{thL}$ as shown by a sign G4 in FIG. 32, the duty ratios of the drive signals SG5 and SG6 are continuously changed (increased or decreased) as shown by a sign G5 in the figure.

While the case that the input DC voltage $V_{in}$ was changed between the voltage $V_{thH}$ and the voltage $V_{thL}$ was shown in FIG. 31, in the case that the input DC voltage $V_{in}$ is higher than the voltage $V_{thH}$, or lower than the voltage $V_{thL}$, the duty ratios of the drive signals SG11 to SG14 and SG21 to SG24 are also changed at a constant amount of change, for example, as shown in FIG. 32.

As above, in the embodiment, since the relative periods in the parallel connection state and the series connection state are changed depending on the level of the input DC voltage $V_{in}$ respectively, values of them can be continuously changed, consequently the abrupt change can be avoided. Accordingly, even if an element having a slow response speed (for example, the error amplifier) exists in the switching unit, the turn ratio (np/ns) between the number of turns np of the primary windings 31A, 31B and the number of turns ns of the secondary windings 32A, 32B of the transformer 3 can be continuously changed, consequently the output DC voltage $V_{out}$ can be stabilized independently of response speed of each element.

While, in the embodiment, either the duty ratios of the drive signals SG5 and SG6 or the duty ratios of the drive signals SG11 to SG14 and SG21 to SG24 is changed according to a range of the input DC voltage $V_{in}$, both of the duty ratios may be changed.

Moreover, in the embodiment, a voltage waveform in changeover control by the control section 70 is not limited to the voltage waveform of the center tap voltage $V_{CT}$ as shown in FIG. 31, and for example, it may be a voltage waveform as shown in FIG. 33 or FIG. 34. Even in a case of such a configuration, the same advantages as in the embodiment can be obtained. However, in a case that the switching circuits 1 and 2 perform the phase shift operation (see FIG. 12 and FIG. 13), since they can perform the Zero Volt Switching operation in the voltage waveform shown in FIG. 31, such a voltage waveform is preferable in the case.

Moreover, in the embodiment, while the comparator Comp1 and the reference power supply Ref3 were provided in the control section 70, when the input DC voltage $V_{in}$ is changed between the voltage $V_{thH}$ and the voltage $V_{thL}$, they may not be provided, so that the arithmetic circuit 74 generates the drive signals SG5 and SG6 based on only the output signal from the comparator Comp3.

Furthermore, the changeover control by the control section 70 as described in the embodiment can be applied to other embodiments of the invention, and similar advantages can be obtained thereby.

While the invention has been described with the first to fifth embodiments hereinbefore, the invention is not limited to the embodiments, and can be variously altered or modified.

For example, while the embodiments were described using a case that the rectifier circuit 4 was configured by a rectifier circuit in anode common connection of a center tap type, for example, the rectifier circuit may be configured by a rectifier circuit of a full-bridge type, or a rectifier circuit in cathode common connection.

Moreover, while the embodiments were described with a case of the switching power supply unit of the step-down type, the invention can be applied to a switching power supply unit of a step-up type.

It should be understood by those skilled in the art that various modifications, combinations, sub-combinations and alterations may occur depending on design requirements and other factors insofar as they are within the scope of the appended claims or the equivalents thereof.

What is claimed is:
1. A switching power supply unit, comprising:
  Two switching circuits each of which is of a full-bridge type including four switching elements, and produces input AC voltages based on an input DC voltage,
  a transformer having two primary windings and secondary windings, each of the two primary windings being pro- vided correspondingly to each of the two switching circuits, and the number of windings of the two primary windings being equal to each other, the transformer transforming the input AC voltages to produce an output AC voltage, an output circuit provided at a secondary side of the transformer, and rectifying the output AC voltage to produce an output DC voltage, a drive circuit driving the two switching circuits in synchronization with each other, two inductors each provided correspondingly to each of the two switching circuits, and a connection changeover unit performing connection changeover such that when the input DC voltage is lower than a threshold voltage, a first current path passing one of the two switching circuits and one of the two primary windings of the transformer, and a second current path passing the other switching circuit and the other primary winding of the transformer are connected in parallel to each other, and on the other hand, when the input DC voltage is higher than the threshold voltage, the first and second current paths are connected in series to each other.

2. The switching power supply unit according to claim 1:
wherein the connection changeover unit includes;
connection changeover elements,
an input voltage detection circuit detecting the input DC voltage, and
a control section controlling the connection changeover elements such that when the input DC voltage detected by the input voltage detection circuit is lower than the threshold voltage, the connection changeover elements are on, and on the other hand, when the input DC voltage is higher than the threshold voltage, the connection changeover elements are off.

3. The switching power supply unit according to claim 2:
wherein a pair of input terminals are provided, and
each of the two switching circuits has two arms provided between a plus connection line led from one of the input terminals, and a minus connection line led from the other of the input terminals, and
the connection changeover elements include a connection changeover element disposed between a first common connection point and the plus connection line, and include another connection changeover element disposed between a second common connection point and the minus connection line, the first common connection point commonly connecting one end of one arm of one of the two switching circuits and one end of one arm of the other of the two switching circuits, the second common connection point commonly connecting the other end of the one arm of the one of the two switching circuits and the other end of the one arm of the other of the two switching circuits.

4. The switching power supply unit according to claim 2:
wherein a pair of input terminals are provided, and
each of the two switching circuits has two arms provided between a plus connection line led from one of the input terminals and a minus connection line led from the other of the input terminals, and
the connection changeover elements include a connection changeover element disposed between a first common connection point and the plus connection line, or include another connection changeover element disposed between a second common connection point and the minus connection line, the first common connection point commonly connecting one end of one arm of one of the two switching circuits and one end of one arm of the other of the two switching circuits, the second common connection point commonly connecting the other end of the one arm of the one of the two switching circuits and the other end of the one arm of the other of the two switching circuits.

5. The switching power supply unit according to claim 2:
wherein a pair of input terminals are provided, and
each of the two switching circuits has two arms provided between a plus connection line led from one of the input terminals and a minus connection line led from the other of the input terminals, and
the connection changeover elements are configured of a bidirectional switch provided in a manner of H-bridge connection with a bridge circuit, the bridge circuit being configured of a couple of arms each included in each of the two switching circuits.

6. The switching power supply unit according to claim 2:
wherein a pair of input terminals are provided, and
one of the two switching circuits has a couple of arms, one of which is provided between a plus connection line led from one of the input terminals and a third common connection point, the other of which is provided between the plus connection line and a fourth common connection point, and
the other switching circuit has another couple of arms, one of which is provided between a minus connection line led from the other of the input terminals and the third common connection point, the other of which is provided between the minus connection line and the fourth common connection point, and
the connection changeover elements are configured of a bidirectional switch and disposed between the third common connection point and the fourth common connection point.

7. A switching power supply unit, comprising:
two switching circuits each of which is of a full-bridge type including four switching elements, and produces input AC voltages based on an input DC voltage,
a transformer having two primary windings and secondary windings, each of the two primary windings being provided correspondingly to each of the two switching circuits, and the number of windings of the two primary windings being equal to each other, the transformer transforming the input AC voltages to produce an output AC voltage,
an output circuits provided at a secondary side of the transformer, and rectifying the output AC voltage to produce an output DC voltage,
a drive circuit driving the two switching circuits in synchronization with each other,
two inductors each provided correspondingly to each of the two switching circuits, and
a connection changeover unit performing connection changeover such that a relative period of parallel connection state and a relative period of series connection state are changed depending on a level of the input DC Voltage, respectively, the parallel connection state being a state where a first current path and a second current path are connected in parallel to each other, the series connection state being a state where the first current path and the second current path are connected in series to each other, the first current path being a path where current passes one of the two switching circuits and one of the two primary windings of the transformer, the second current path being a path where current passes the other switching circuit and the other primary winding of the transformer.

8. The switching power supply unit according to claim 7:
wherein the connection changeover unit performs connection changeover such that as the input DC voltage is increased, the relative period of the parallel connection state is decreased, while the relative period of the series connection state is increased.

9. The switching power supply unit according to claim 7:
wherein the connection changeover unit includes;
connection changeover elements,
an input voltage detection circuit detecting the input DC voltage, and
a control section controlling the connection changeover elements such that the relative period of parallel connection state are decreased as the input DC voltage detected by the input voltage detection circuit increases.

* * * * *